United States Patent
Håkansson et al.

(10) Patent No.: US 11,513,506 B2
(45) Date of Patent: Nov. 29, 2022

(54) CONFIGURING AN INDUSTRIAL AUTOMATION SYSTEM FOR INTERNET-OF-THINGS ACCESSIBILITY

(71) Applicant: BEIJER ELECTRONICS AB, Malmö (SE)

(72) Inventors: Tommy Håkansson, Löddeköpinge (SE); Mats Carlsson, Veberöd (SE)

(73) Assignee: BEIJER ELECTRONICS AB, Malmö (SE)

( * ) Notice: Subject to any disclaimer, the term of this patent is extended or adjusted under 35 U.S.C. 154(b) by 364 days.

(21) Appl. No.: 16/631,410

(22) PCT Filed: Jul. 17, 2018

(86) PCT No.: PCT/SE2018/050771
§ 371 (c)(1),
(2) Date: Jan. 15, 2020

(87) PCT Pub. No.: WO2019/017830
PCT Pub. Date: Jan. 24, 2019

(65) Prior Publication Data
US 2020/0218240 A1 Jul. 9, 2020

(30) Foreign Application Priority Data

Jul. 17, 2017 (SE) .................................... 1750942-3
Oct. 30, 2017 (SE) .................................... 1751339-1

(51) Int. Cl.
G05B 19/418 (2006.01)
G06F 3/0482 (2013.01)
G06Q 10/00 (2012.01)

(52) U.S. Cl.
CPC ....... *G05B 19/4188* (2013.01); *G06F 3/0482* (2013.01); *G05B 2219/32128* (2013.01); *G05B 2219/32134* (2013.01); *G06Q 10/20* (2013.01)

(58) Field of Classification Search
CPC .............. G06Q 10/0631; G05B 19/409; G05B 19/32128; G05B 19/4185; G06F 3/04817; G06F 3/0484; Y02P 90/02
See application file for complete search history.

(56) References Cited

U.S. PATENT DOCUMENTS 6,559,860 B1 * 5/2003 Hamilton ................ G06T 11/60
715/848
8,291,309 B2 10/2012 Callaghan et al.
(Continued)

FOREIGN PATENT DOCUMENTS

| CN | 1695108 B * | 9/2012 | .......... G06F 3/0486 |
| EP | 2660667 A2 | 11/2013 | |
| WO | 2017064560 A1 | 4/2017 | |

OTHER PUBLICATIONS

Extended Search Report for corresponding European Patent Application No. 18835189.4 dated Mar. 16, 2021.
(Continued)

*Primary Examiner* — Vincent H Tran
(74) *Attorney, Agent, or Firm* — Sandberg Phoenix & von Gontard PC

(57) ABSTRACT

A method (400) for configuring an industrial automation system (1) for internet-of-things accessibility involves a computing device (101) which a) receives (410) a first user input indicative of a functional object (70) representing one or more low-level devices (10) and/or automation devices (20) and/or supervising and production control devices (30). The computing device (101) also b) receives (420) a second user input indicative of a cloud object (72) representing a cloud service provider (3) being external to the industrial automation system (1). The computing device (101) further c) receives (430) a third user input indicative of a user terminal object (74) representing a user terminal device (4) being external to the industrial automation system (1). The
(Continued)

computing device (101) then d) causes (440) the cloud service provider (3) to enable communication between the user terminal device (4) and at least one (2) of the devices (10, 20, 30) in the industrial automation system (1) as represented by the functional object (70) via the cloud service provider (3).

27 Claims, 24 Drawing Sheets

(56) References Cited

U.S. PATENT DOCUMENTS

| | | | |
|---|---|---|---|
| 9,363,336 B2 | 6/2016 | Lawson et al. | |
| 9,477,936 B2 | 10/2016 | Lawson et al. | |
| 9,690,877 B1* | 6/2017 | Lavian | G06F 16/972 |
| 10,205,638 B1* | 2/2019 | Angrish | H04L 41/0806 |
| 11,263,693 B1* | 3/2022 | Blum | G06Q 30/0283 |
| 11,269,930 B1* | 3/2022 | Davis | G06F 16/29 |
| 11,270,601 B2* | 3/2022 | Yu | G09B 23/285 |
| 2011/0029102 A1* | 2/2011 | Campney | G05B 17/02 |
| | | | 700/83 |
| 2012/0023277 A1* | 1/2012 | Graf | G05B 19/054 |
| | | | 710/110 |
| 2013/0211546 A1 | 8/2013 | Lawson et al. | |
| 2014/0059440 A1* | 2/2014 | Sasaki | H04L 41/145 |
| | | | 715/735 |
| 2014/0336795 A1 | 11/2014 | Asenjo et al. | |
| 2014/0343696 A1 | 11/2014 | Plache et al. | |
| 2015/0074749 A1 | 3/2015 | Vasko et al. | |
| 2015/0160637 A1 | 6/2015 | Lloyd | |
| 2016/0062334 A1 | 3/2016 | Davis | |
| 2016/0173342 A1* | 6/2016 | Latham | H04L 41/22 |
| | | | 715/735 |
| 2016/0274552 A1* | 9/2016 | Strohmenger | G06Q 10/06 |
| 2017/0170977 A1 | 6/2017 | Rao | |
| 2017/0195265 A1 | 7/2017 | Billi et al. | |
| 2018/0020073 A1* | 1/2018 | Boss | H04L 41/5035 |
| 2018/0107188 A1* | 4/2018 | Nixon | G05B 19/052 |
| 2018/0109955 A1* | 4/2018 | Nixon | H04L 43/045 |
| 2022/0051298 A1* | 2/2022 | Raskin | G06Q 30/0277 |
| 2022/0066895 A1* | 3/2022 | Itkin | G06F 11/2294 |

OTHER PUBLICATIONS

International Search Report for PCT/SE2018/050771 dated Dec. 5, 2018.
Written Opinion for PCT/SE2018/050771 dated Dec. 5, 2018.
Swedish Patent Office Notice (4 month) and Swedish Search Report for corresponding Swedish Patent Application No. 1751339-1 dated May 25, 2018.

* cited by examiner

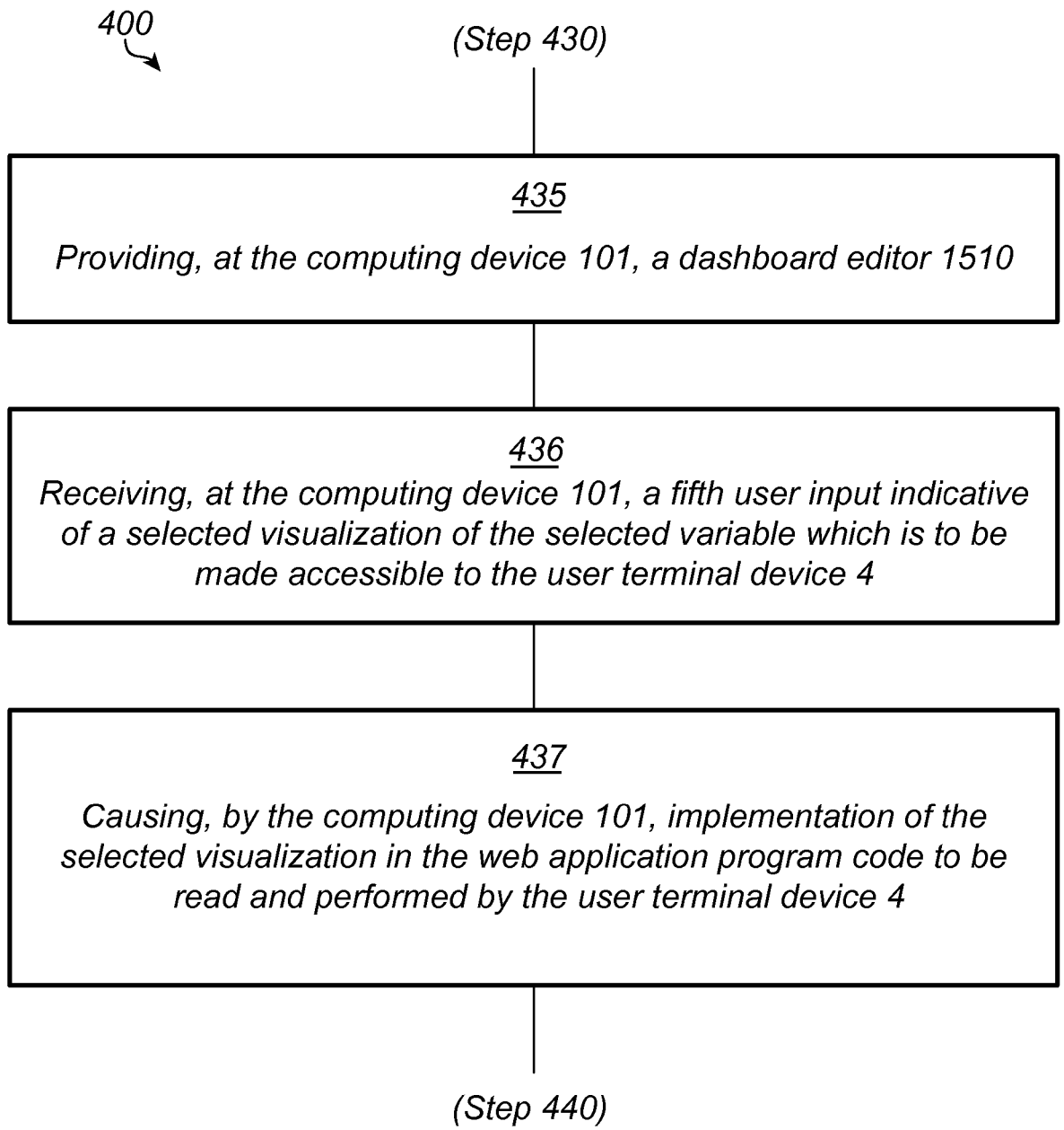

CONFIGURING AN INDUSTRIAL AUTOMATION SYSTEM FOR INTERNET-OF-THINGS ACCESSIBILITY

CROSS-REFERENCE TO RELATED APPLICATIONS

This application is the US National Stage under 35 USC § 371 of International Application No. PCT/SE2018/050771, filed 17 Jul. 2018 which claims priority to Swedish Application Nos. 1750942-3 and 1751339-1 filed 17 Jul. 2017 and 30 Oct. 2017, respectively, all of which are incorporated herein by reference.

TECHNICAL FIELD

The present disclosure relates generally to the field of industrial automation, and more particularly, it relates to a method and computer program for configuring an industrial automation system for internet-of-things accessibility.

BACKGROUND

Industrial automation is the use of various control systems, such as computers or robots, and information technologies for operating and controlling equipment such as industrial processes in factories, vehicles, ships, aircrafts, and other applications without significant human intervention. Industrial automation facilitates to increase the product quality, accuracy, precision, reliability and production rate while reducing production and design cost. Since the automation reduces the human involvement, the possibility of human errors also decreases.

The automatic operation and control of industrial processes involve the use of automatic control devices including PLCs (programmable logic controllers), PACs (programmable automation controllers), PCs, etc., and technologies include various industrial communication systems.

Although industrial automation may be associated with a high initial cost, it saves the monthly wages of the workers which leads to substantial cost savings for the companies. The maintenance cost associated with machinery used for industrial automation is less because it does not often fail.

Industrial automation systems can be very complex, including a large number of devices working in synchronization with automation technologies. As the level of automation increases, process control become more complicated. Currently, the control logic of programmable logic controllers (PLC) is usually programmed using a ladder diagram (LD) or functional block diagram (FBD) or structured text (ST) supported by the IEC 61131-3 standard. Designing and implementing complex industrial automation systems involves extensive PLC programming. Logical errors introduced by human errors of the PLC programmers may delay delivery and start-up of the industrial automation system due to debugging. In addition to a time consuming programming phase involving extensive programming resources, logical errors introduced by human errors may cause fatal consequences during the operation of the industrial automation system. For example, an erroneous alarm signal may be generated in response to a sensor signal based on real time parameters like temperature, pressure, level etc or not occur at all, or a controller may generate incorrect electrical signals to control the processes, including pneumatic actuators, relays, DC motors etc resulting in reduced product quality, accuracy, precision, reliability and/or production rate.

HMI (Human Machine Interface) panels provide the means by which process operators interact with the PLC control system for monitoring and/or setting various parameters like temperature, pressure, flow, level, etc of the process.

There is a need to provide convenient access to the components, data and statuses of industrial automation systems for persons and devices not being within the physical premises of the industrial automation systems, or even being remote therefrom.

SUMMARY

It is an object of the present disclosure to obviate at least some of the above disadvantages and to provide an improved method of configuring an industrial automation system to provide internet-of-things accessibility.

According to a first aspect of the present disclosure, this is achieved by a method of configuring an industrial automation system for internet-of-things accessibility. The industrial automation system has a system hierarchy including (without limitation, and in any number) low-level devices like sensors and actuators, automation devices like PLC (Programmable Logic Controller) devices, robots and CNC (Computer Numerical Control) machines, and supervision and production control devices like HMI (Human Machine Interface) devices, general-purpose computers and special purpose computers. The method comprises:

a) receiving, at a computing device, a first user input indicative of a functional object representing one or more of said low-level devices, and/or one or more of said automation devices, and/or one or more of said supervising and production control devices in the industrial automation system;

b) receiving, at the computing device, a second user input indicative of a cloud object representing a cloud service provider being external to the industrial automation system;

c) receiving, at the computing device, a third user input indicative of a user terminal object representing a user terminal device being external to the automation system; and d) causing, by the computing device, the cloud service provider to enable communication between the user terminal device and at least one of the devices in the industrial automation system as represented by the functional object via the cloud service provider.

Hence, internet-of-things accessibility is made available for the industrial automation system.

The functionalities in steps a), b), c) and d) above do not have to be performed in the order listed above.

In a preferred embodiment, the functional object, the cloud object and the user terminal object are selectable objects in an automation system configuration program executed on or by the computing device. Even more preferably, the functional object, the cloud object and the user terminal object are selectable objects which may be dragged by a user from a selection area and dropped onto a workspace or canvas area of the automation system configuration program.

In a preferred embodiment, the method involves:

e) presenting, at the computing device, a plurality of variables (a.k.a. tags) for said at least one of the devices in the industrial automation system as represented by the functional object;

f) receiving, at the computing device, a fourth user input indicative of a selected variable among said plurality of variables; and g) causing, by the computing device, said at least one of the devices in the industrial automation system as represented by the functional object to make the selected variable accessible to the user terminal device.

Even more preferably, the fourth user input in step f) may further be indicative of whether the selected variable is to be made accessible to the user terminal device as:

a unidirectional variable value being readable by the user terminal device, a unidirectional variable value being settable by the user terminal device, or a bidirectional variable value being both readable and settable by the user terminal device.

In one embodiment, the aforementioned automation system configuration program, which is executed on or by the computing device, is communicatively connected with a HMI tool and/or a PLC tool and/or a cloud tool being installed in or accessible by the computing device. The HMI tool is a configuration program for supervision and production control devices in the industrial automation system. The PLC tool is a configuration program for automation devices in the industrial automation system.

The aforementioned automation system configuration program may execute step d) and/or g) by invoking functionality in the HMI tool and/or PLC tool and/or cloud tool which will then communicate with the cloud service provider via an Application Programming Interface (API) or similar to enable communication between said at least one of the devices in the industrial automation system as represented by the functional object and the user terminal device, as well as to make the selected variable communicatively accessible between these devices. The communication between the HMI tool and/or PLC tool and the cloud service provider may, for instance, occur in accordance with a protocol like MQTT, AMQP or OPC UA.

The cloud service provider and said at least one of the devices in the industrial automation system may be configured for communication with each other during runtime using an IP address.

The cloud service provider (or alternatively the automation system configuration program, the HMI tool and/or the PLC tool) may further generate web application program code, such as HTML5, to be read and performed by (a web browser of) the user terminal device in order to communicate with said at least one of the devices in the industrial automation system as represented by the functional object.

The cloud service provider may moreover generate and/or administrate a link to the generated web application program code, and provide the link to the user terminal device. The user terminal device may use the link to retrieve the generated web application program code. In one embodiment, the link is embedded in a computer readable graphic code, such as a QR code or similar, which is provided to the user terminal device.

In a preferred embodiment, the method involves:

h) providing, at the computing device, a dashboard editor, i) receiving, at the computing device, a fifth user input indicative of a selected visualization of the selected variable which is to be made accessible to the user terminal device, and j) causing, by the computing device, the cloud service provider (or alternatively the automation system configuration program, the HMI tool and/or the PLC tool) to implement the selected visualization in the web application program code to be read and performed by (the web browser of) the user terminal device.

The visualization may, for instance and without limitation, be a graphical meter, diagram, chart, numerical indication, symbol, icon, etc.

The user terminal may generally be any suitable computing device, including but not limited to a mobile communication terminal (e.g. smart phone), tablet computer, portable computer, etc.

According to a second aspect, a computer program comprises program instructions for causing a computer to perform the method of configuring an industrial automation system according to the first aspect, when the program is run on a computer.

In some embodiments, the computer program is provided on a carrier and comprises computer executable instructions for causing a computer to perform the method of configuring an industrial automation system as described herein, when said program is run on the computer.

In some embodiments, the carrier is a record medium, computer memory, read-only memory, computer-readable medium or an electrical carrier signal.

According to a third aspect, a computer program product comprises a computer-readable medium, having thereon computer program code means, when said computer program product is loaded, to make a computer execute the method of configuring an industrial automation system according to the first aspect.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Further objects, features and advantages of the present disclosure will appear from the following detailed description of embodiments, reference being made to the accompanying drawings.

FIG. 4C is a flowchart of a method of configuring an industrial automation system according to an embodiment.

DETAILED DESCRIPTION OF EMBODIMENTS

Figure 1:
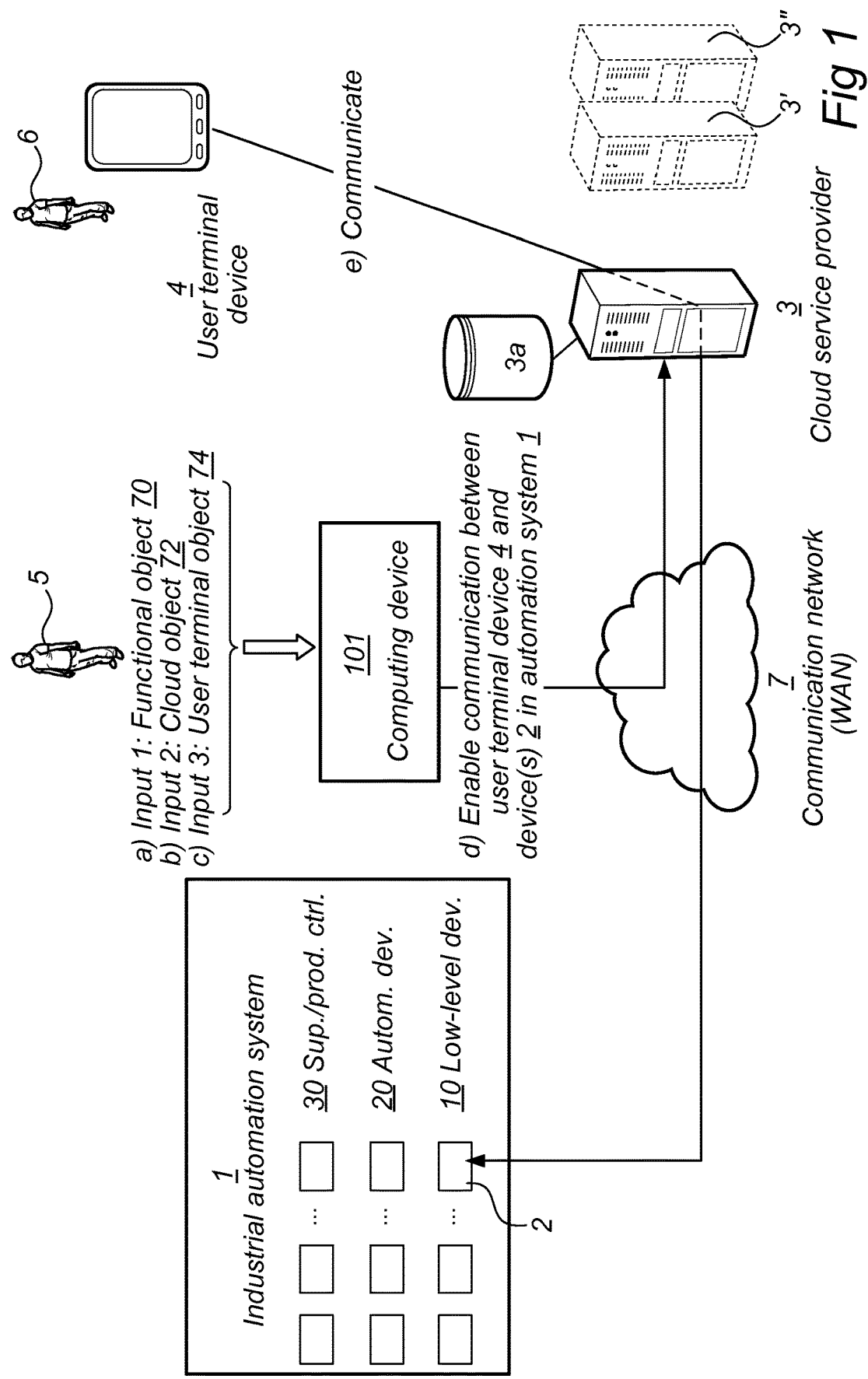
FIG. 1 is a schematic block and signal diagram illustrating novel and inventive configuration of an industrial automation system according to the present disclosure for internet-of-things accessibility.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Reference is made to FIG. 1 which illustrates how an industrial automation system 1 may be configured in order to provide internet-of-things accessibility to the industrial automation system for persons and devices not being within the physical premises of the industrial automation system, or even being remote from it.

Figure 2:
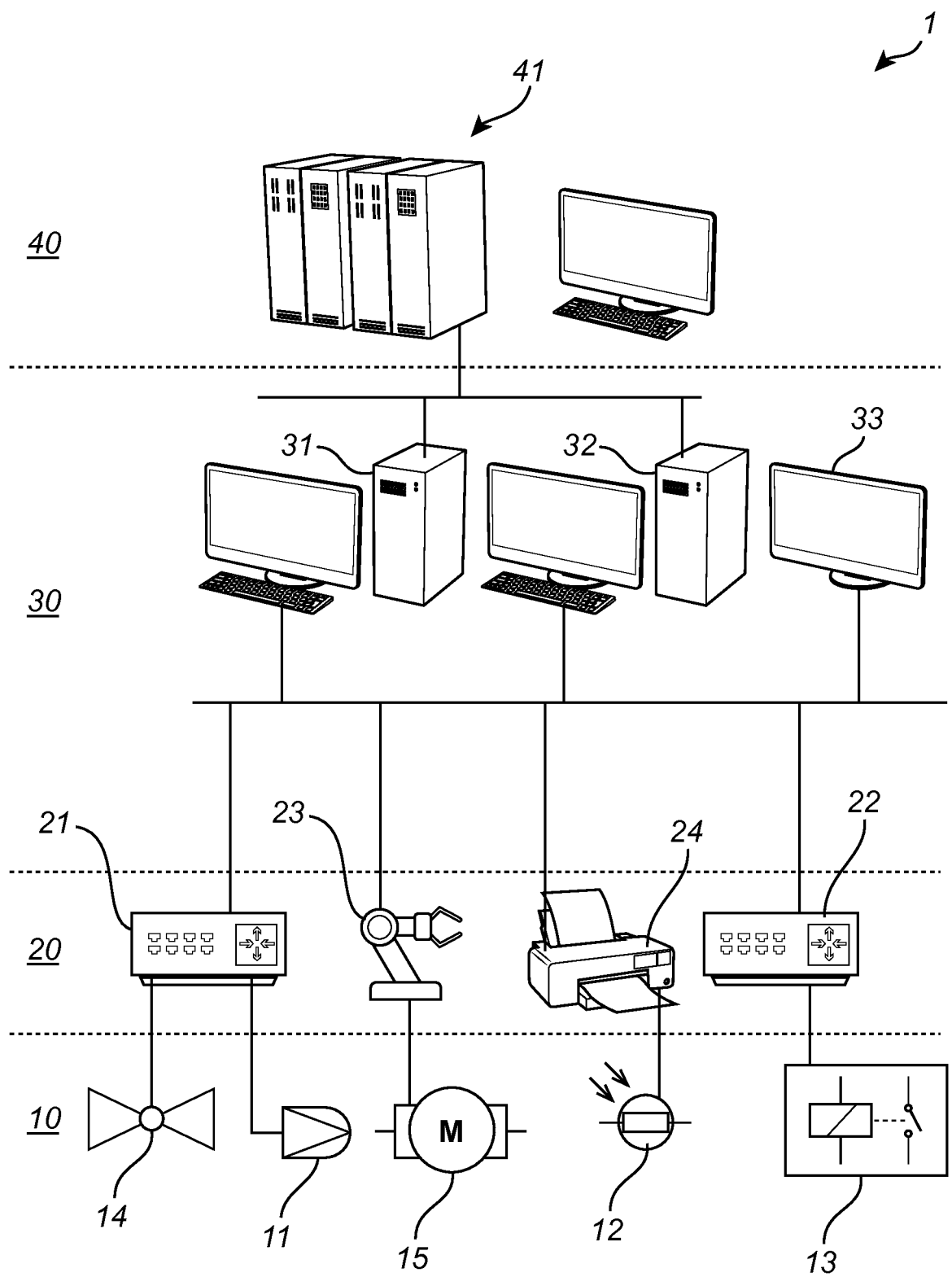
FIG. 2 is a schematic block diagram illustrating an example industrial automation system topology.

An example of such an industrial automation system 1 is shown in FIG. 2. The industrial automation system 1 comprises different hierarchical levels forming a hierarchical arrangement of the industrial automation system.

The lowest level of the automation hierarchy includes low-level devices 10 like sensors 11, 12 and actuators 13, 14, 15. The sensors may be, but is not limited to, flowmeters, temperature sensors, photo-diodes, thermistors, proximity sensors, etc. The sensors 11, 12 are configured to detect events or changes, such as temperature, light, pressure, flow, level, etc., in the environment of the industrial automation system 1 and convert these real time parameters into electrical signals forming data of processes and machines to be transferred to the next higher level, i.e. the control level for monitoring and analysis. The environment may be, but is not limited to, industrial processes in factories, vehicles, ships, aircraft, and other applications.

The control level of the automation hierarchy may include, but is not limited to, various automation devices 20 like PLC (Programmable Logic Controller) devices 21, 22, robots 23 and CNC (Computer Numerical Control) machines 24 etc., which acquire the process parameters from the various sensors. The automatic controllers of the various automation devices drive the actuators on the lowest level based on the processed sensor signals and control programs. The actuators may be, but are not limited to, relays 13, control valves 14, DC/servo motors 15, pneumatic actuators, etc., configured to convert the electrical signals from the controllers of the automation devices 21, 22, 23, 24 into mechanical means to control the processes.

The PLCs are robust industrial controllers configured to deliver automatic control functions to the actuators based on input from the sensors. A PLC device may comprise, but is not limited to, a central processing unit (CPU/Controller) or microprocessor, memory/storage, input and output (I/O) units (analog and digital) and communication modules for wired and/or wireless communication. The PLC device allows the operator to program control functions to perform automatic operation on the process.

The next level above the control level in the automation hierarchy is the supervision and production control level, which comprises supervising and production control devices 30. In this level, PCs (Personal Computers) 31 or special purpose computers 32 and monitoring system 33, such as Human Machine Interface (HMI) devices, are provided for supervising and setting various parameters, logging data about the process, etc.

The top level of the industrial automation hierarchy is the information or enterprise level 40, which may comprise computer systems 41 for managing the overall industrial automation system, including but not limited to commercial activities such as production planning, customer and market analysis, orders and sales, etc.

Referring back to FIG. 1, the industrial automation system 1 is shown in a more compact form, comprising different low-level devices 10, automation devices 20 and supervising and production control devices 30 in any number. A user 5 may use a computing device 101 to configure the industrial automation system 1 for internet-of-things (IoT) accessibility in accordance with a method 400 which is illustrated by way of a flowchart in FIG. 4A.

As seen at a) in FIG. 1, the IoT accessibility configuration involves receiving, at a computing device 101, a first user input indicative of a functional object 70 representing one or more of the low-level devices 10, and/or one or more of the automation devices 20, and/or one or more of the supervising and production control devices 30 in the industrial automation system 1. The first user input is typically provided by the user 5. This corresponds to step 410 in FIG. 4A.

Then, as seen at b) in FIG. 1, the IoT accessibility configuration involves receiving, at the computing device 101, a second user input indicative of a cloud object 72 representing a cloud service provider 3 being external to the industrial automation system 1. Again, the second user input is typically provided by the user 5. This corresponds to step 420 in FIG. 4A.

Following this, as seen at c) in FIG. 1, the IoT accessibility configuration involves receiving, at the computing device 101, a third user input indicative of a user terminal object 74 representing a user terminal device 4 being external to the industrial automation system 1. Like the first and second user inputs, the third user input is typically provided by the user 5. This corresponds to step 430 in FIG. 4A.

As a result of steps a)-c)/410-430, the IoT accessibility configuration then involves causing, by the computing device 101, the cloud service provider 3 to enable communication between the user terminal device 4 and at least one of the devices 10, 20, 30 in the industrial automation system 1 as represented by the functional object 70 via the cloud service provider 3. Such at least one device among the devices 10, 20, 30 is indicated as device 2 in FIG. 1. This corresponds to step 440 in FIG. 4A.

Having been configured for IoT accessibility in this manner, the user terminal device 4 and the aforesaid least one device 2 of the devices 10, 20, 30 in the industrial automation system 1 may then communicate over a communication network 7, such as a TCP/IP-based WAN (Wide Area Network), which may be the Internet or part of it. This is seen at e) in FIG. 1. By such communication e) a user 6 of the user terminal device 4 may, for instance, monitor the aforesaid least one device 2 of the devices 10, 20, 30 in the industrial automation system 1, and/or interact with it, even though the user 6 is not physically at the site of the industrial automation system 1.

Figure 3A:
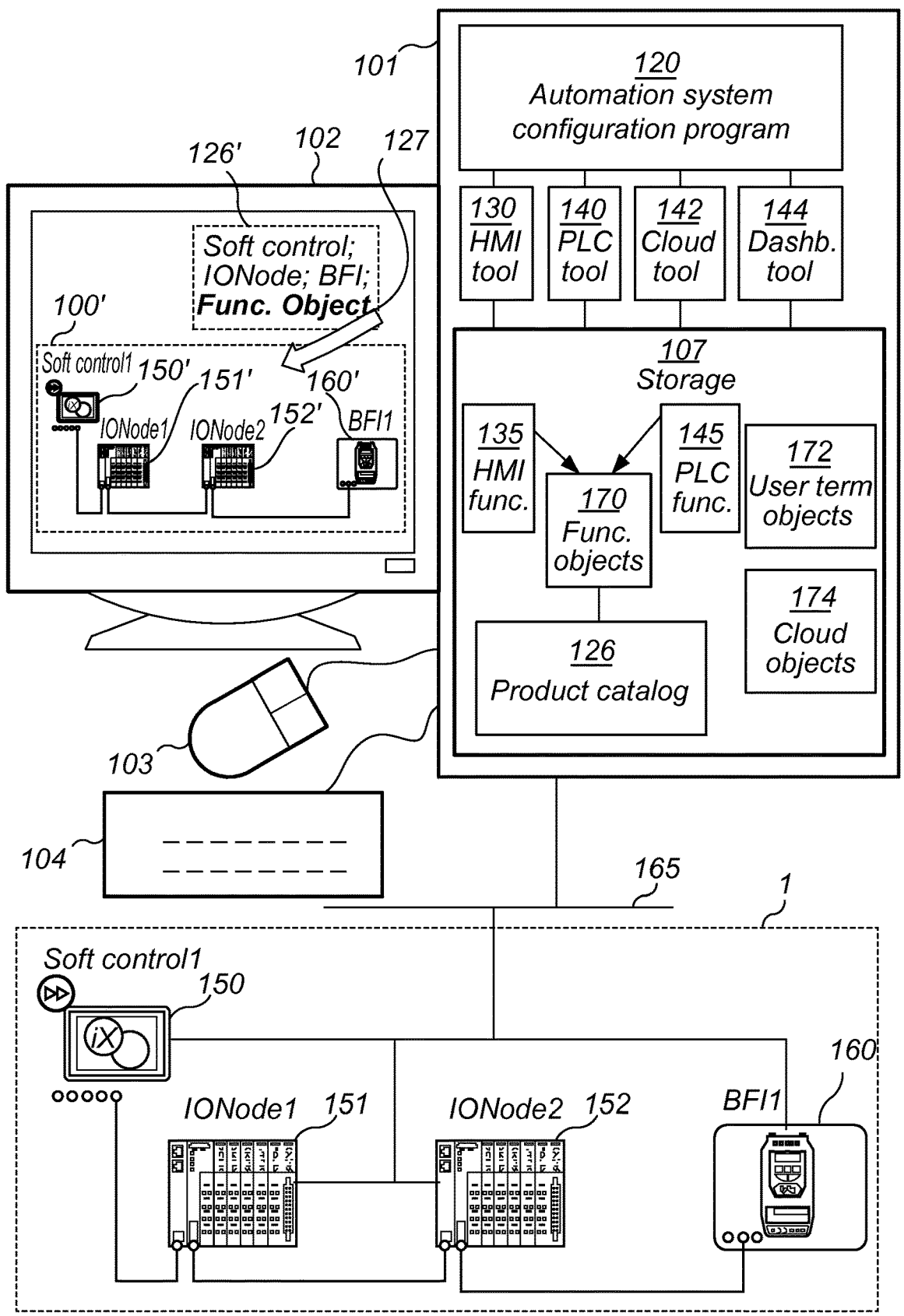
FIG. 3A is a schematic block diagram of a computer implemented setup for configuration of an industrial automation system according to an embodiment.
Figure 3B:
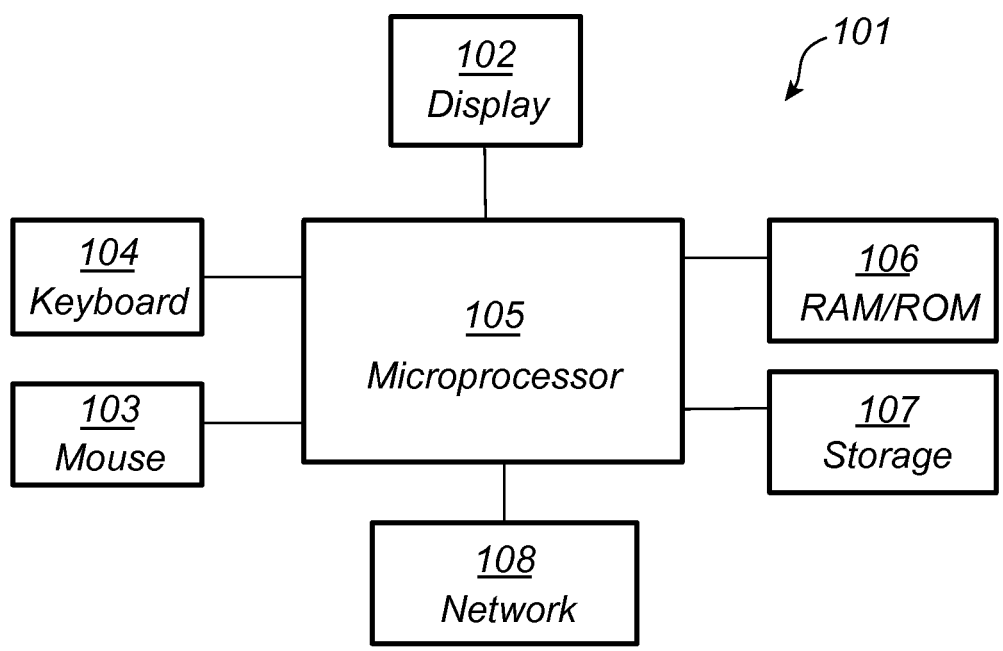
FIG. 3B is a schematic block diagram of a computing device used in the computer implemented setup in FIG. 3A.

As seen in FIGS. 3A and 3B, the computing device 101 typically comprises a central processing unit or microprocessor 105 operatively connected to internal memory 106, including at least RAM and ROM. It also typically comprises input devices such as a mouse 103 and keyboard 104, output devices such as a display 102, and a non-volatile storage device 107 such as a hard disk drive and/or a solid state drive (SSD), etc. In addition, the computing device 101 typically comprises at least one network interface 108 to enable network communication with the communication network 7 and an industrial network 165 of the industrial automation system 1. The computing device 101 may typically be a desktop computer or laptop computer, or alternatively a tablet computer, mobile phone or personal digital assistant.

The cloud service provider 3 may typically comprise a server computer, a cluster of such server computers, or a cloud computing resource or service. The cloud service provider 3 may be a public cloud service provider or a private cloud service provider. There may be additional cloud service providers (each being public or private), as seen at 3' and 3" in FIG. 1.

The user terminal device 4 may typically comprise a mobile phone, tablet computer, personal digital assistant, laptop computer, desktop computer, etc. It may access the communication network 7 by wireless communication in compliance with for instance WCDMA, HSPA, GSM, UTRAN, UMTS, LTE or LTE Advanced, or alternatively by wired data communication based, for instance, on TCP/IP.

FIG. 3A is a schematic block diagram of a computer implemented setup for configuration of the industrial automation system 1 by the computing device 101. The setup comprises an automation system configuration program 120 which is executed on or by the computing device 101. The setup also comprises an HMI tool 130, a PLC tool 140, a cloud tool 142 and a dashboard tool 144.

The HMI tool 130 is a computer implemented software platform configured and used for designing HMI (Human Machine Interface) devices to enable interactions between humans (operator or user) and the devices and machines in the industrial automation system 1. The interaction by means of the HMI allows for effective operation and control of the machine from the human end, whilst the machine simultaneously feeds back information to the operator for decision-making. The HMI (Human Machine Interface) devices provide the means by which process operators interact with the PLC control system for monitoring and/or setting various parameters like temperature, pressure, flow, level, etc of the process. The HMI tool 130 may be, but is not limited to, the iX Developer Tool™ provided by Beijer Electronics AB.

The PLC tool 140 is a computer implemented software platform for industrial automation technology for creating programmable and configurable automation components. The PLC tool 140 may be, but is not limited to, the CODESYS™ Development System, being an IEC 61131-3 programming tool provided by 3S-Smart Software Solutions GmbH. This tool covers project engineering, programming, operation on workstations, as well as execution, debugging of application code on the controller or drive, and evaluation of field devices.

The cloud tool 142 may be used for creating and editing cloud objects (including cloud object 72) and also for communicating with the service provider 3 to configure, initiate or control the establishment of the communication between the user terminal device 4 and said at least one device 2 among the devices 10, 20, 30 in the industrial automation system 1 (as represented by the functional object (70)) via the cloud service provider 3.

The dashboard tool 144 may include a dashboard editor 1510 which will be described later with reference to FIGS. 14 and 15A-15F.

The automation system configuration program 120 is a computer implemented software platform for configuring of industrial automation systems, including industrial automation system 1. As is well recognized in the technical field, industrial automation systems can be very complex, including a large number of devices working in synchronization with automation technologies. The industrial automation system 1 seen in FIG. 3A is an illustrative example of an industrial automation system which includes a few modules and is not intended to limit the scope of the claimed invention. The display 102 of the computing device 101 shows a virtual industrial automation system 100' representing a real world implementation of the industrial automation system 1, including different physical devices. The virtual industrial automation system 100' is created and configured by means of the HMI tool 130 operating in response to the user's 5 interaction with the HMI tool through the user interface of the computing device 101 which includes the display 102, the mouse 103 and keyboard 104. The virtual industrial automation system 100' may be a soft control project in this embodiment.

One or more components may be selected from a product catalog 126 including software components defining different selectable devices stored in the storage 107 of the computing device 101. The user 5 may search and filter for a specific item or just pick one in a product list 126' representing the product catalog 126 on the display 102.

A device, for example a soft control device 150, is represented by a virtual soft control component 150' in the virtual industrial automation system 100', which is selected from the product list 126' by drag and drop, to the workspace forming the virtual industrial automation system 100', as is illustrated by a curved arrow 127.

Hence, as a non-limiting but illustrative example, the soft control project 100' may be created by drag and drop of the soft control component 150', first and second virtual distributed I/O components 151' and 152', representing first and second distributed I/O devices 151 and 152, and an inverter component (BFI1) 160' from the product list 126' representing a inverter device (BFI1) 160 to be connected to for example, but not limited to, EtherCAT and Modbus TCP.

An advantageous feature in this regard is the user's 5 use (and optionally creation) of functional objects. It is recalled from the description above with reference to FIG. 1 that a functional object 70 represents one or more of the low-level devices 10, and/or one or more of the automation devices 20, and/or one or more of the supervising and production control devices 30 in the industrial automation system 1. To this end, a functional object 70 may include, but is not limited to, ready-made, embedded functionality such as PLC code, HMI screens, Tags, Alarms and even C# scripting. A functional object may be stored in the storage 107 in a set of available functional objects 170 (or as part of the product catalog 126) and be selectable from the product list 126' by dragging it into the workspace 100' and just dropping it on a device. All embedded code is then injected into the targeted devices. For example, the user 5 may drag the functional object from the product list 126' and drop it on the SoftControl1 component 150' or inverter component 160' in the workspace 100' to add the new functionality.

In this example, the functional object 70 will add on both PLC and HMI application parts to the Inverter component 160'. As an example, function blocks, program code and global variables of CODESYS are connected to tags and a screen in the iX Developer application.

The above notwithstanding, it is to be emphasized that the meaning of the term "functional object" in this disclosure shall be considered to mean a software object capable of representing at least one device in an industrial automation system, this being the only limitation.

Figure 4A:
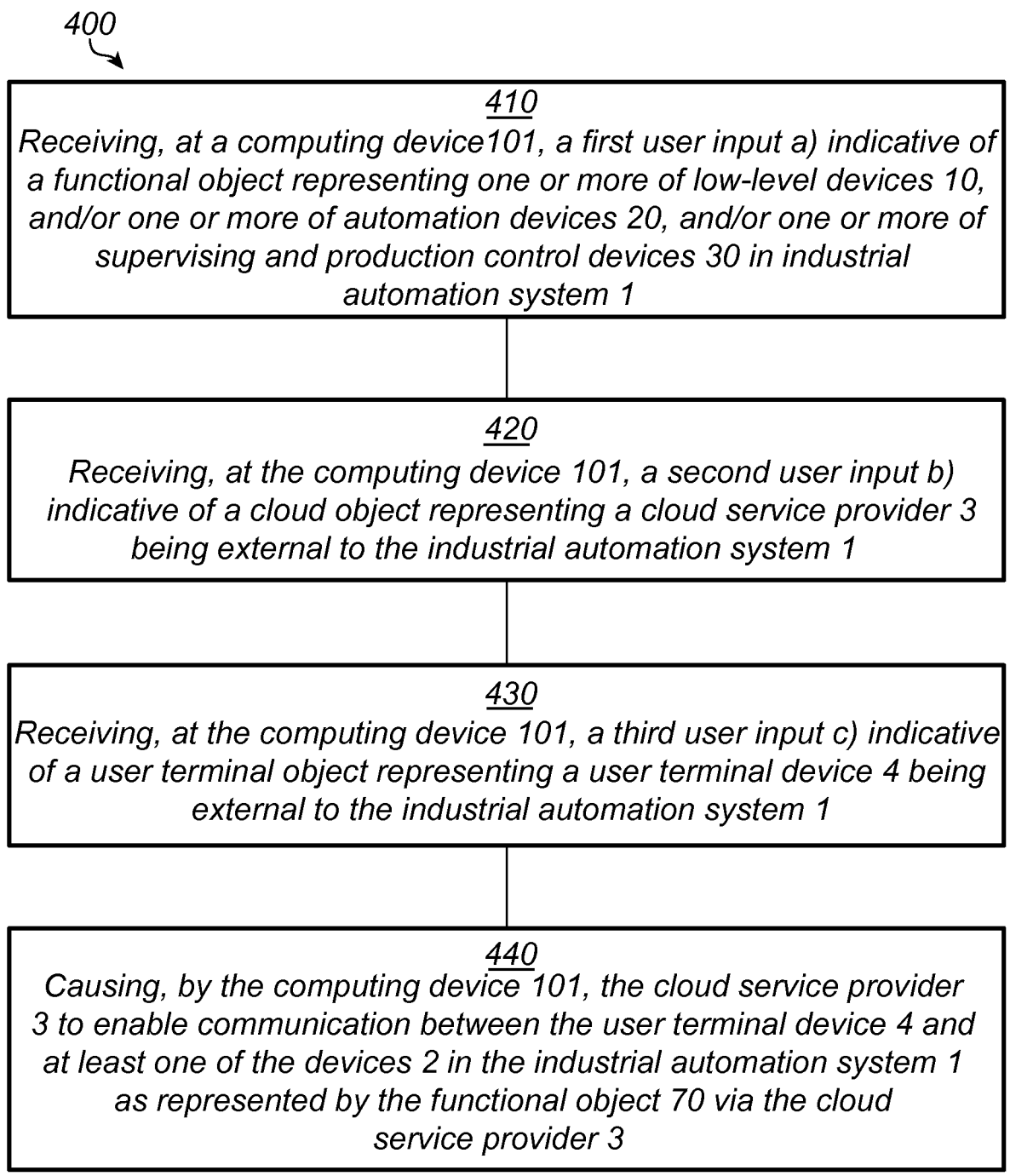
FIG. 4A is a flowchart of a method of configuring an industrial automation system for internet-of-things accessibility according to the aforementioned first aspect of the present disclosure.

Correspondingly, just like the functional object 70, the cloud object 72 and the user terminal object 74 referred to above for FIG. 1 and FIG. 4A are advantageously selectable objects 172, 174 in the automation system configuration program 120. More specifically, and as is seen in more detail in FIGS. 7, 9 and 13, the functional object 70, the cloud object 72 and the user terminal object 74 are advantageously selectable objects 170/714, 172/914, 174/1314 which may be dragged 718, 918, 1318 by the user 5 from a selection area 710, 910, 1310 and dropped onto a workspace or canvas area 720, 920, 1320 of the automation system configuration program 120.

Figure 4B:
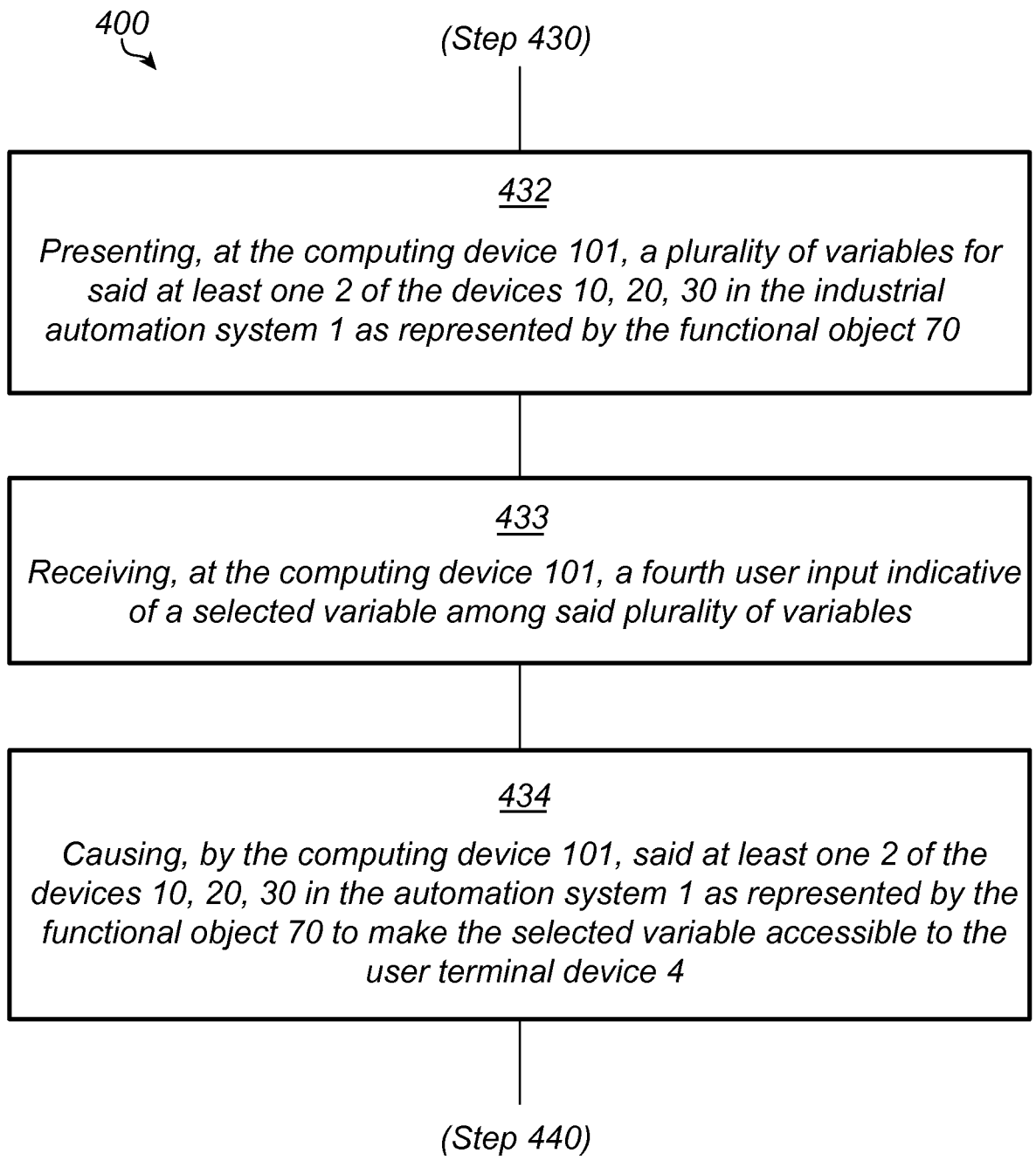
FIG. 4B is a flowchart of a method of configuring an industrial automation system according to an embodiment.
Figure 10:
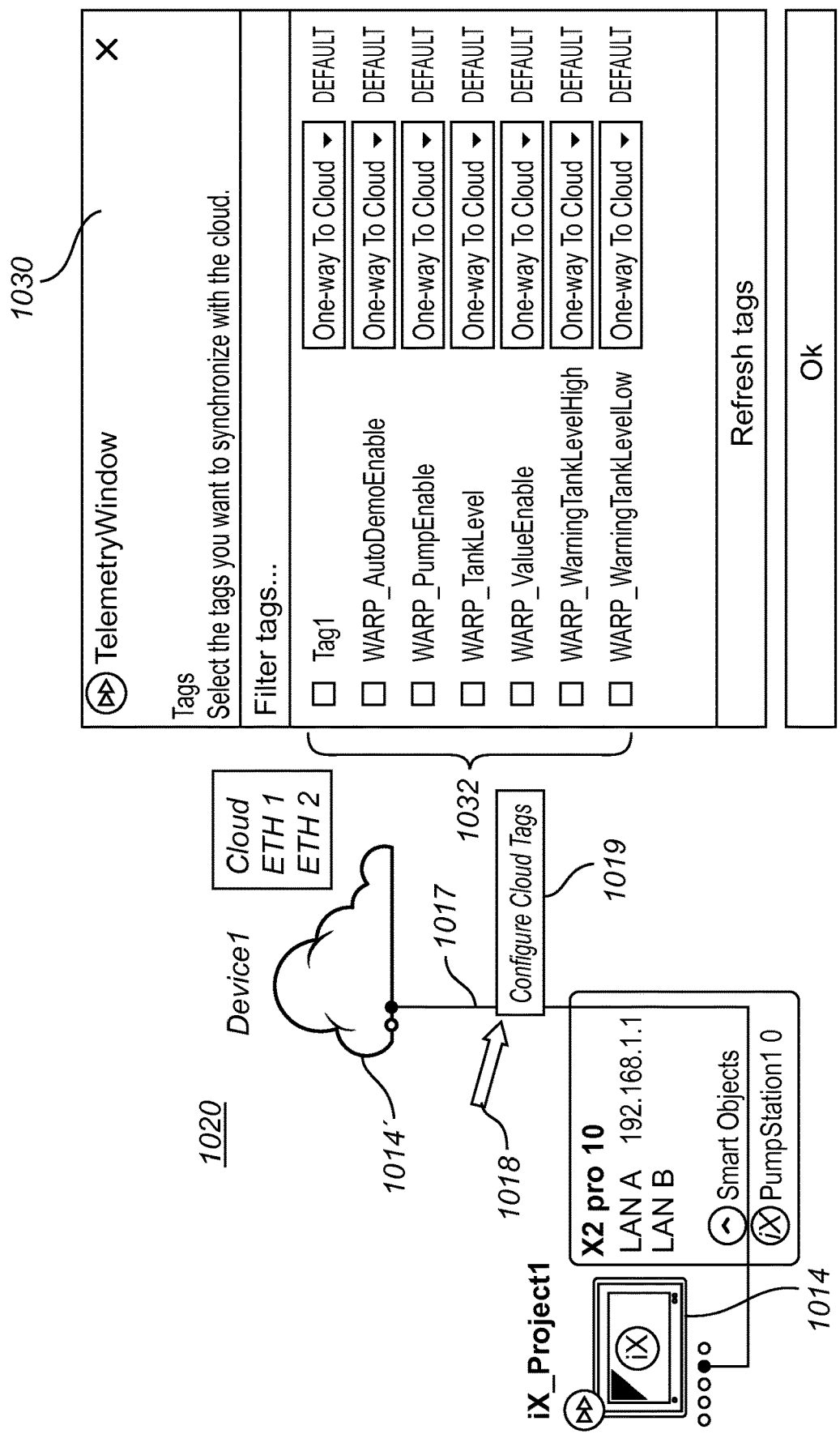
Figure 11:
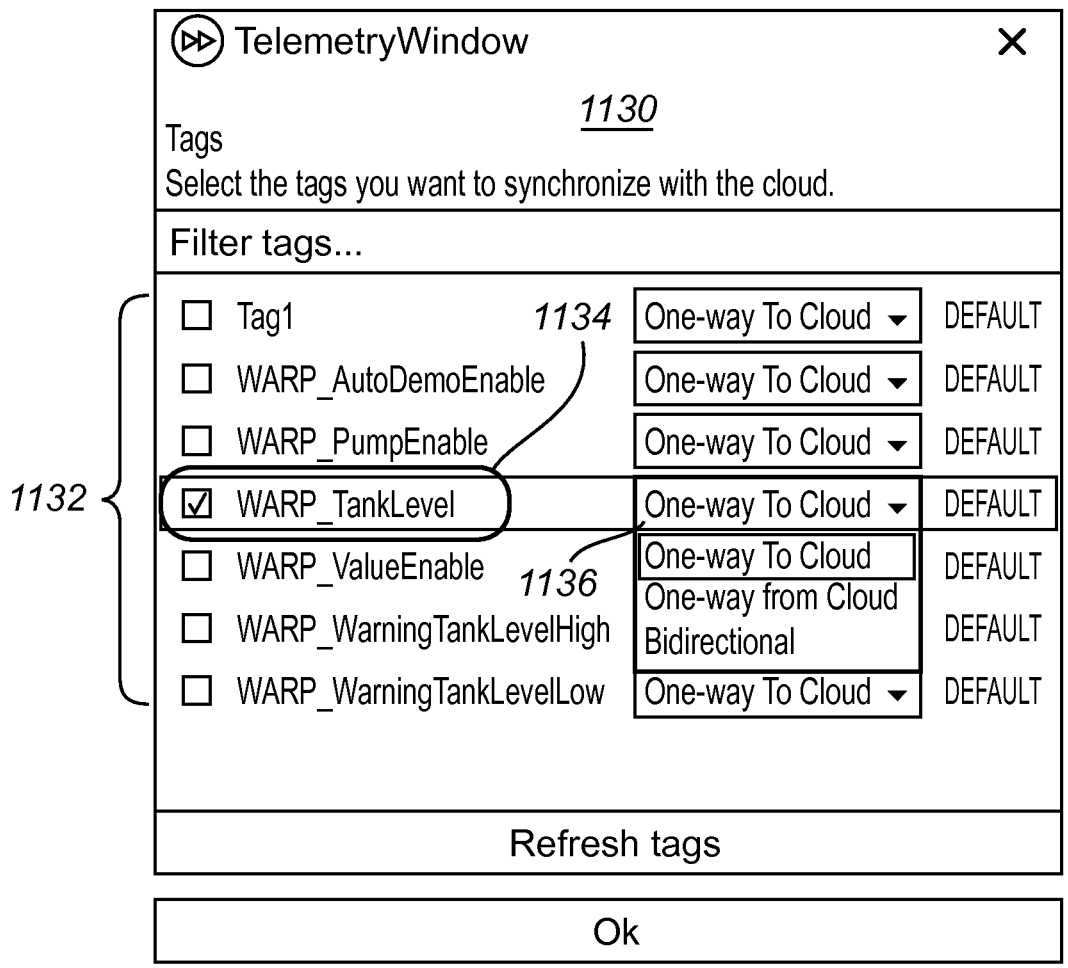

The IoT accessibility configuration as described above for FIG. 1 and FIG. 4A advantageously further comprises e) presenting, at the computing device (101), a plurality of variables, or tags, for said at least one device 2 of the devices 10, 20, 30 in the industrial automation system 1 as represented by the functional object 70. This is seen at 432 in FIG. 4B. An example is also seen in FIG. 10 and FIG. 11, see for instance 1032 in FIGS. 10 and 1132 in FIG. 11.

The variables, or tags, of each such device 2 may represent physical parameters such as temperature, voltage, current, pressure, torque, movement angle, fill level, etc, possibly read by sensor elements included in or connected to the device 2. The variables, or tags, of each such device 2 may represent actual values or set values of a control process that the device 2 is involved in. Furthermore, the variables, or tags, of each such device 2 may represent logical parameters such as error signals, alarm conditions, on and off commands, etc.

Beneficially, the IoT accessibility configuration moreover further comprises f) receiving, at the computing device 101, a fourth user input indicative of a selected variable among said plurality of variables. This is seen at 433 in FIG. 4B. Also see 1134 in FIG. 11.

Moreover, the IoT accessibility configuration may further comprise g) causing, by the computing device (101), said at least one device 2 of the devices 10, 20, 30 in the industrial automation system 1 as represented by the functional object 70 to make the selected variable accessible to the user terminal device 4. This is seen at 434 in FIG. 4B.

Advantageously, the fourth user input in step f) is further indicative of whether the selected variable is to be made accessible to the user terminal device 4 as:
- a unidirectional variable value being readable by the user terminal device 4,
- a unidirectional variable value being settable by the user terminal device 4, or
- a bidirectional variable value being both readable and settable by the user terminal device 4. See 1136 in FIG. 11.

As is understood from FIG. 3A, the automation system configuration program 120 is communicatively connected with the HMI tool 130 and (possibly or) the PLC tool 140 which are installed in or accessible by the computing device 101. It is recalled that the HMI tool 130 is a configuration program for the supervision and production control devices 30 in the industrial automation system 1, whereas the PLC tool 140 is a configuration program for the automation devices 20 in the industrial automation system 1.

The automation system configuration program 120 may execute the aforementioned step d) in FIG. 1 (step 440 in FIG. 4A) by invoking functionality in the HMI tool 130 and/or the PLC tool 140 and/or the cloud tool 142 to communicate with the cloud service provider 3 to enable said communication between said at least one device 2 of the devices 10, 20, 30 in the industrial automation system 1 and the user terminal device 4.

Correspondingly, the automation system configuration program 120 may execute the aforementioned step g) (step 434 in FIG. 4B) by invoking functionality in the HMI tool 130 and/or the PLC tool 140 and/or the cloud tool 142 to communicate with the cloud service provider 3 to make the selected variable communicatively accessible between said at least one device 2 of the devices 10, 20, 30 in the industrial automation system 1 and the user terminal device 4.

In one embodiment, the above involves the following. The cloud service provider 3 has a database 3a or similar storage and stores therein information regarding the variable or variables of the device 2 which have been selected by the user 5 for IoT accessibility by the user terminal device 4. The cloud service provider 3 may also store a defined periodicity or other time scheme for the reporting of the selected variable or variables by the device 2 to the service provider 3. Such periodicity or time scheme may have been configured by the user 5 using the automation system configuration program 120 or cloud tool 142.

The device 2 may be provided with a default IP address which causes the device 2, for instance at next boot, to contact the cloud service provider 3 and retrieve information about the selected variable or variables, as well as the defined periodicity or time scheme. The device 2 may also retrieve an IP address (the default IP address or a different IP address) for future use when communicating with the cloud service provider 3 during runtime.

During runtime, the device 2 will communicate with the cloud service provider 3 at the defined periodicity or time scheme to report the current values of the selected variable or variables. The cloud service provider 3 will store the received current variable value or values in its database 3a or similar storage. The user terminal device 4 may retrieve the stored current variable value or values from the cloud service provider 3. This applies to variables which are bidirectional or unidirectionally readable by the user terminal device 4.

For variables which are bidirectional or unidirectionally settable by the user terminal device 4, the user terminal device 4 may provide changes to any of these variables to the cloud service provider 3, which will store a changed variable value in its database 3a or similar storage. When the device 2 communicates with the cloud service provider 3 at the defined periodicity or time scheme during runtime, the device 2 may retrieve the changed variable value from the cloud service provider 3 and update its local variable accordingly.

The aforementioned step d) in FIG. 1 (step 440 in FIG. 4A) may comprise generating web application program code to be read and performed by the user terminal device 4 in order to communicate with said at least one device 2 of the devices 10, 20, 30 in the industrial automation system 1. The generation of the web application program code may be done by the dashboard tool 144 of the automation system configuration program 120.

The generation of the web application program code may also involve generating and/or administrating a link to the generated web application program code, and providing the link to the user terminal device 4. Examples are seen in FIG. 15E and FIG. 15F. Hence, the link may be presented as a text 1528 or alternatively be encoded in a machine-readable graphical code, such as a QR code 1532.

The user terminal device 4 may use the link to retrieve the generated web application program code. This may for instance be done by the user 6 by copying (see button 1530 in FIG. 15E) the link text 1528 into a web browser of the user terminal device 4. Alternatively, it may be done by scanning the QR code 1532 by a QR code reader program in the user terminal device 4, wherein the decoded link to the web application program code may be provided by the QR code reader program to the web browser of the user terminal device 4.

During runtime, the user terminal device 4 performs the web application program code, and variable values as stored in the database 3a or similar storage of the cloud service provider 3 will be retrieved from the cloud service provider 3 for presentation to the user 6 (for bidirectional and unidirectionally readable variables), or set by the user 6 and provided to the cloud service provider 3 to be stored as changed variable values in the database 3a or similar storage of the cloud service provider 3 (for bidirectional and unidirectionally settable variables).

The communication between the device 2 and the cloud service provider 3 may, in addition to the IP address, be based on a data encryption certificate or similar, thereby enhancing the data integrity. The communication between the user terminal device 4 and the cloud service provider 3 during runtime may be based on http or a similar web protocol, and the user terminal device 4 may access the cloud service provider 3 over a web interface or similar (i.e. by visiting an url or uri address).

In summary, therefore, an additional inventive aspect (being a part of the other inventive aspects as described herein, or being an invention of its own) can be seen as a method including the following activities occurring at runtime:

When the selected variable is a bidirectional variable or a unidirectional variable value being readable by the user terminal device 4, said at least one device 2 of the devices 10, 20, 30 in the industrial automation system 1 communicates with the cloud service provider 3 at a defined periodicity or time scheme to report a current value of the selected variable. The cloud service provider 3 receives the reported current value and stores it in its database 3a or similar storage.

When the selected variable is a bidirectional variable or a unidirectional variable value being settable by the user terminal device 4, said at least one device 2 of the devices 10, 20, 30 in the industrial automation system 1 communicates with the cloud service provider 3 at the defined periodicity or time scheme to retrieve a value of the selected variable as changed by the user terminal device 4 and stored by the cloud service provider 3 in its database 3a or similar storage.

The user terminal device 4 communicates with the cloud service provider 3 to retrieve the stored variable value from the database 3a or similar storage and to provide a changed variable value to be stored in the database 3a or similar storage, respectively.

Hence, no communication occurs directly between the device 2 and the user terminal device 4.

There are no particular limitation in the defined periodicity or time scheme. The communication of variable values between the device 2 to the cloud service provider 3 may occur seldom or often, or even almost in real-time as soon as the variable value changes at the device 2 or at the user terminal device 4.

Figure 14:
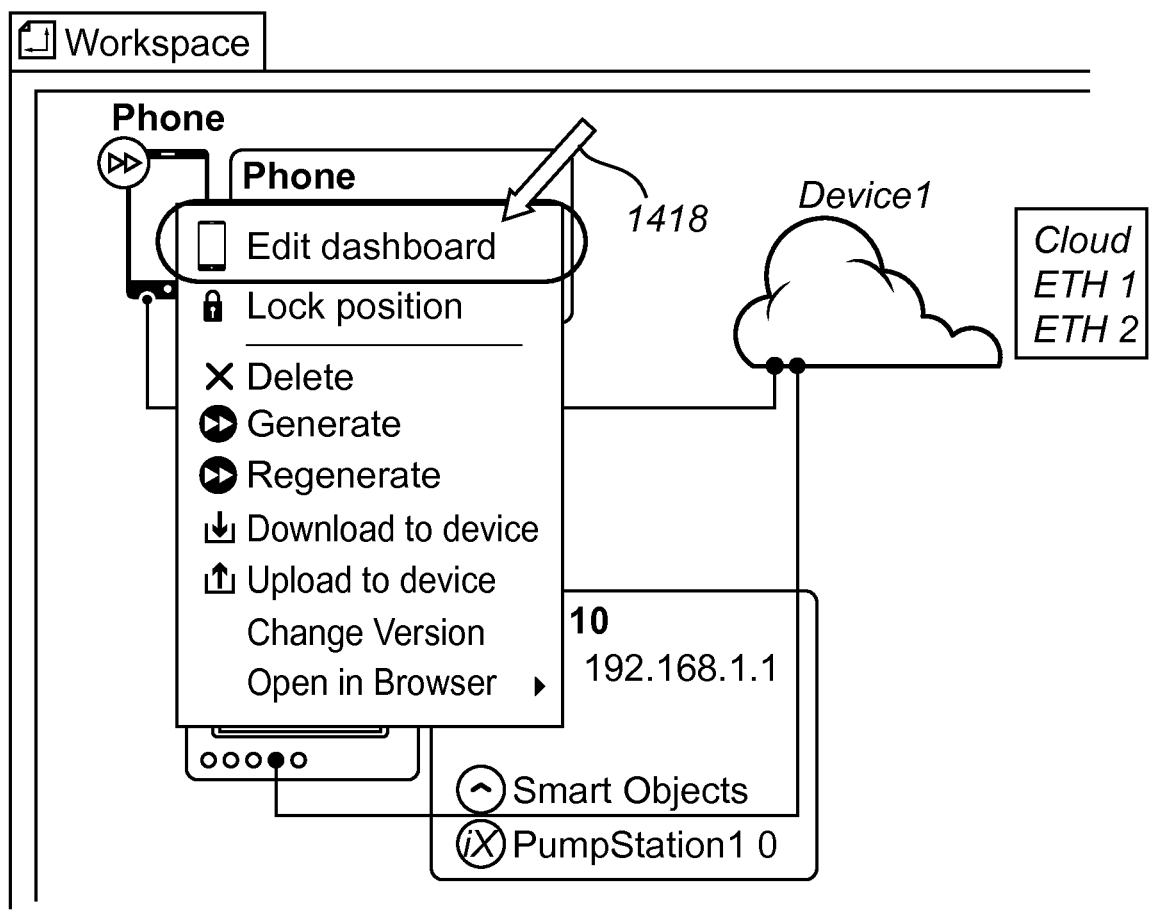
Figure 15A:
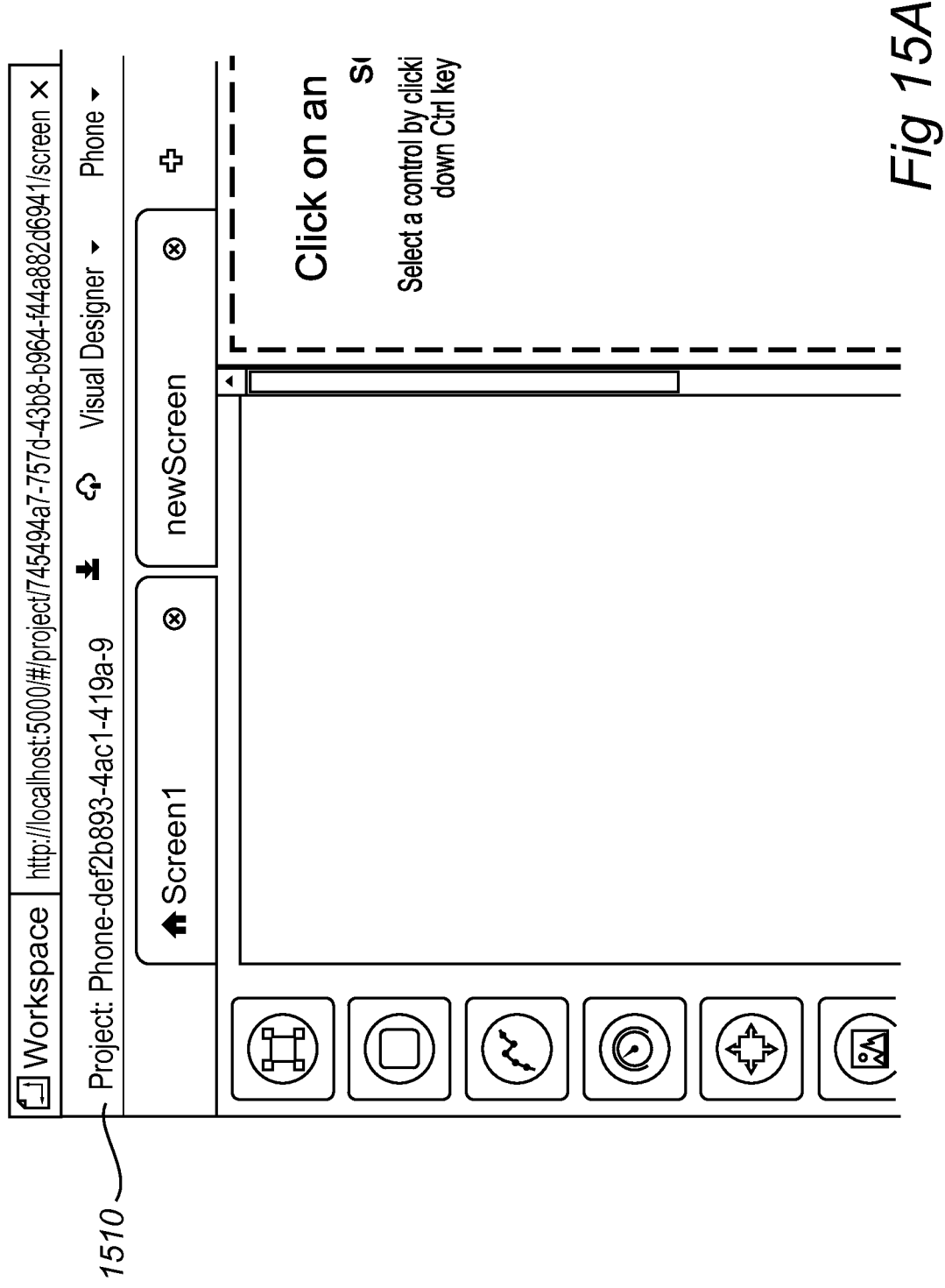
Figure 15B:
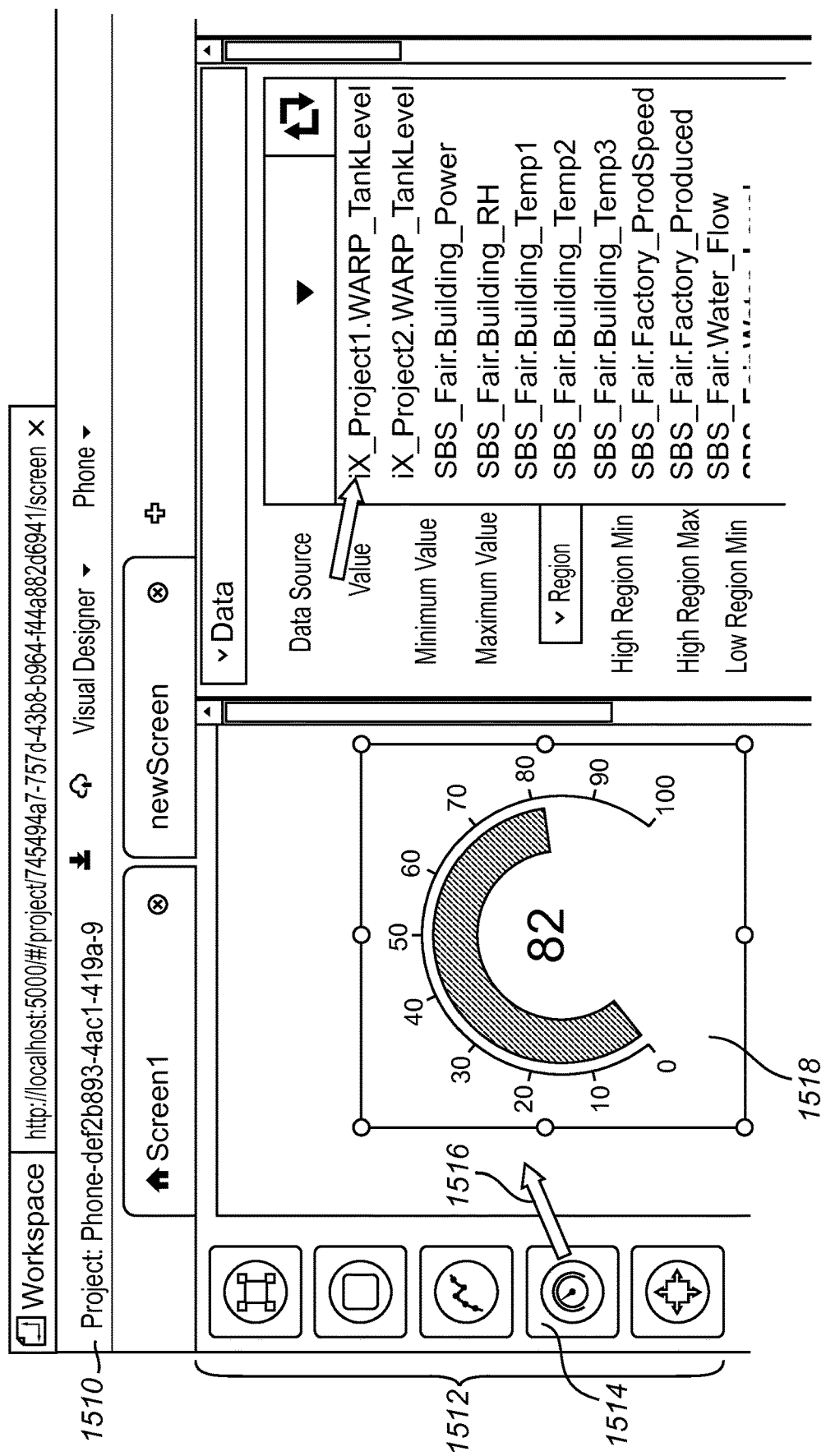

One embodiment, which is illustrated in FIG. 4C as well as in FIG. 14, FIG. 15A and FIG. 15B, involves the provision of the aforementioned dashboard editor (see 1510 in FIG. 15A and FIG. 15B), being part of the dashboard tool 144, to allow visualization of the variables of the device 2 to the user terminal device 4. Hence, the IoT accessibility configuration as described herein may advantageously further comprise:

h) providing a dashboard editor 1510 at the computing device 101 (see 435 in FIG. 4C), i) receiving at the computing device 101 a fifth user input indicative of a selected visualization of the selected variable which is to be made accessible to the user terminal device 4 (see 436 in FIG. 4C, also see selection 1516 in FIG. 15B), and j) causing by the computing device 101 implementation of the selected visualization in the web application program code to be read and performed by the user terminal device 4 (see 436 in FIG. 4C, also see 1518 in FIG. 15B).

As can be seen at 1512 in FIG. 15B, the visualization may for instance be one or more of a graphical meter 1518, a diagram, a chart, a numerical indication, a symbol, and an icon.

FIGS. 6-16 are example depictions of a configuration screen interface used by the user 5 of the aforementioned computing device 101 to configure the industrial automation system 1 in accordance with the aforementioned method for providing IoT accessibility.

Figure 6:
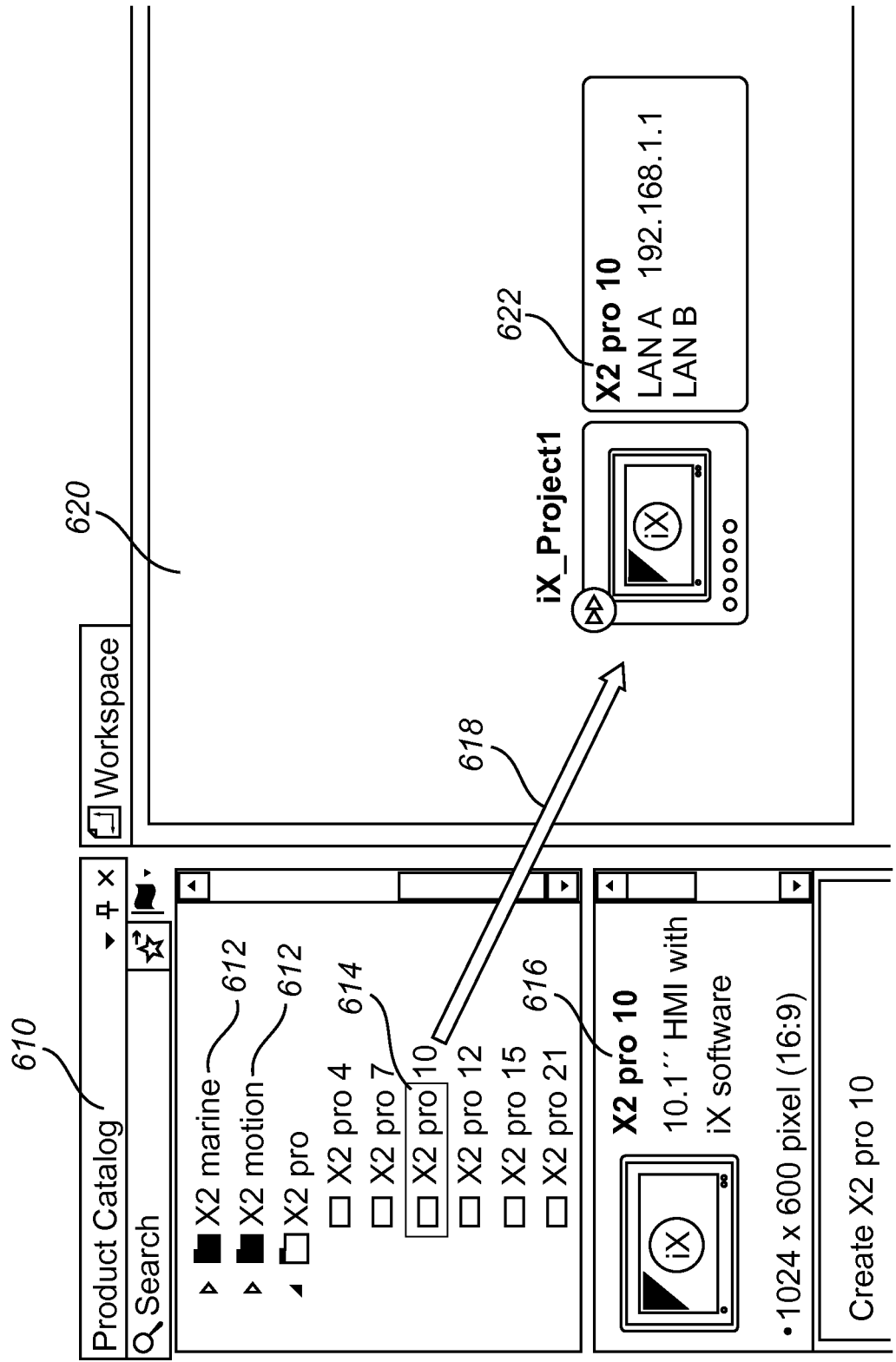
FIGS. 6-16 are example depictions of a configuration screen interface used by a configuration user of the aforementioned computing device to configure an industrial automation system in accordance with the aforementioned method and embodiments thereof.

FIG. 6 illustrates how the user 5 may create a new project in the automation system configuration program 120. The automation system configuration program 120 has a product catalog view 610 and a workspace 620. The product catalog view 610 shows a plurality of devices 612, and the user 5 may add a device 614 by dragging it as seen at 618 to the workspace 620, wherein the added device will be seen at 622 in the workspace 620, and also at 616.

Figure 7:
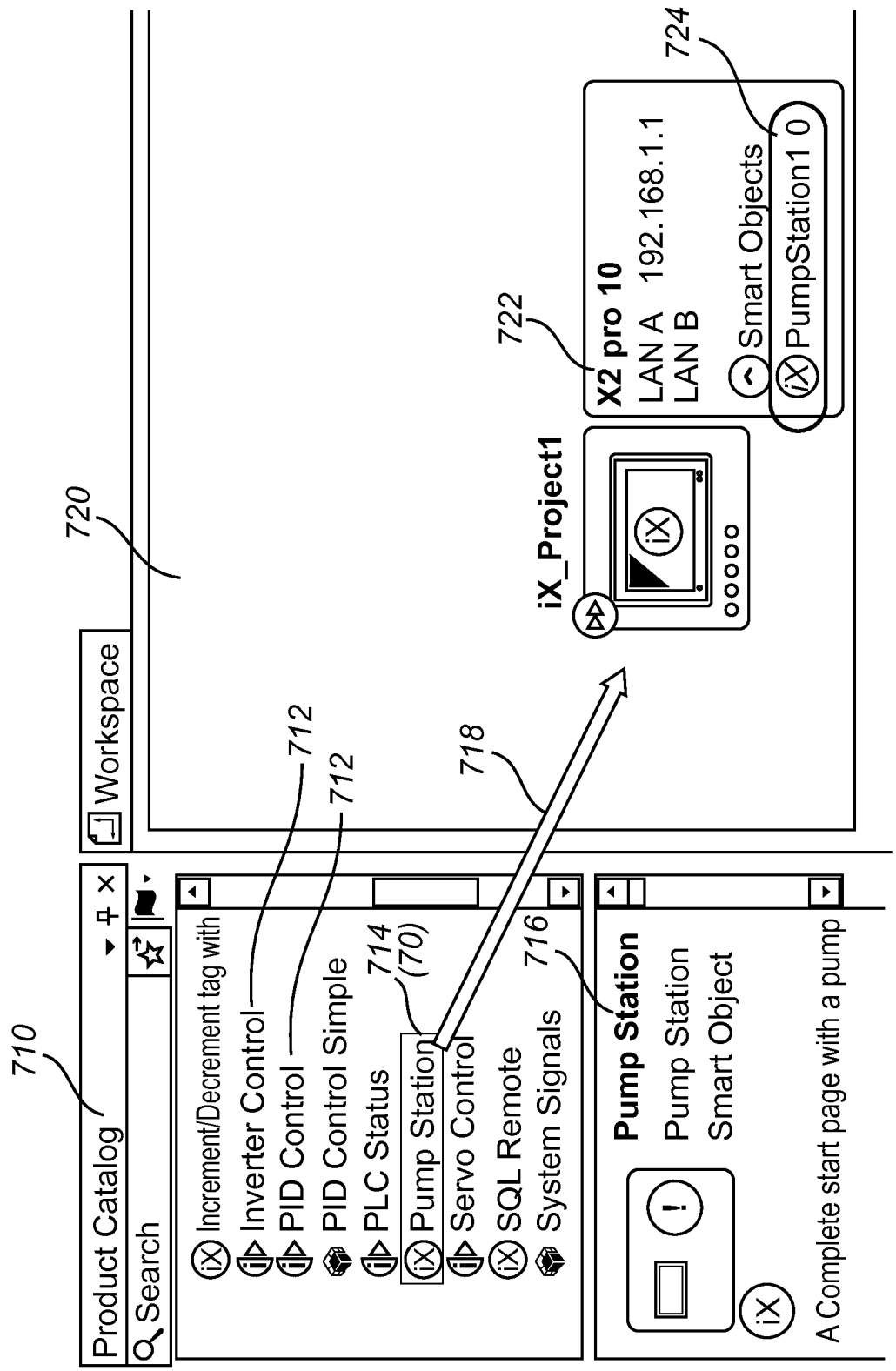

FIG. 7 illustrates how the user 5 may add a functional object 70, here in the form of a pump station 714, to the created project. See step a) in FIG. 1 and step 410 in FIG. 4A. This involves the user 5 selecting the functional object 70/714 from a list 712 in the product catalog view 710 and dragging it onto the workspace 720 in the automation system configuration program 120, as seen at 718. Details of the functional object 70/714 are shown at 716, 722 and 724.

Figure 8:
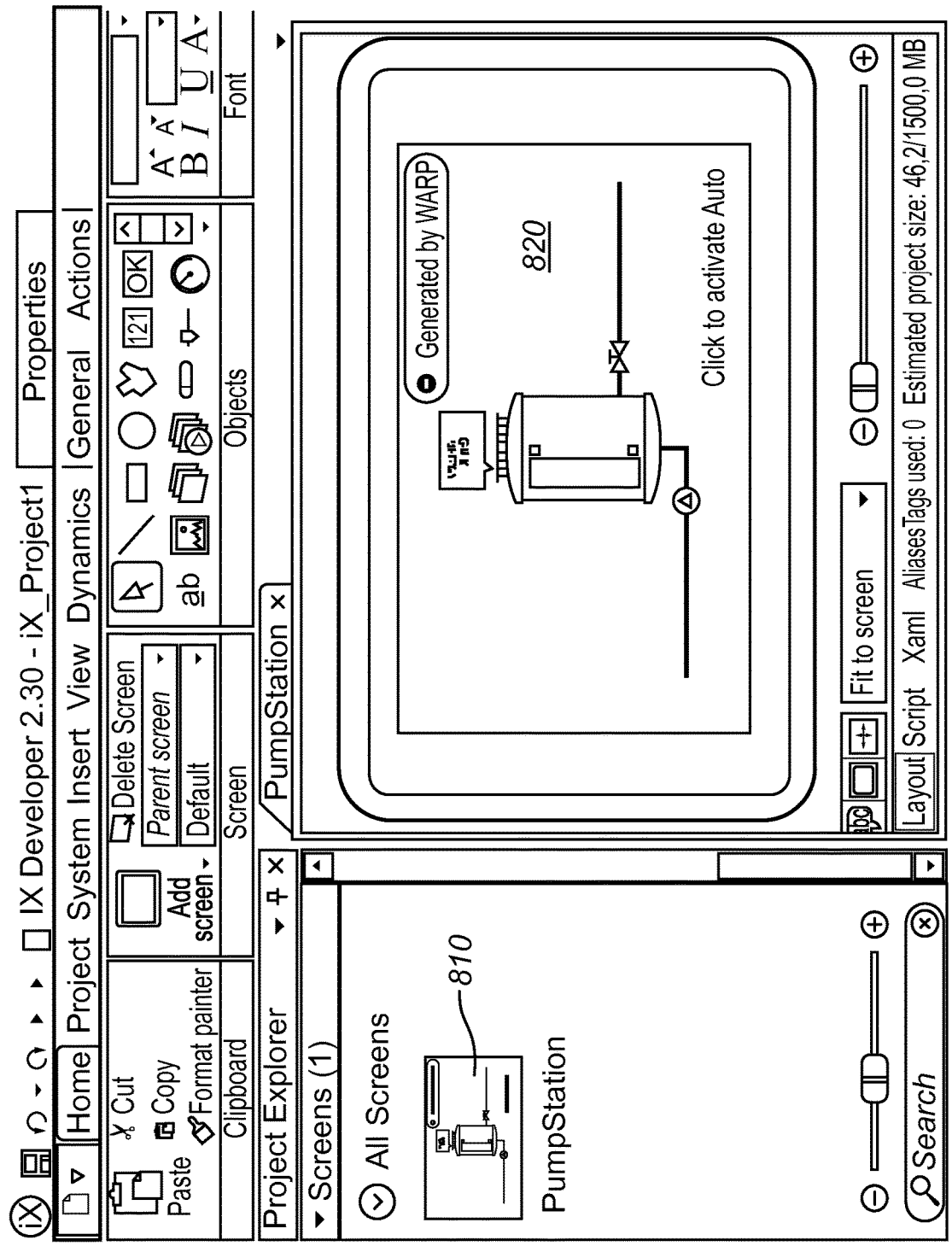

In FIG. 8, the user 5 generates an HMI project in the HMI tool 130 based on the created project in the automation system configuration program 120. As a result, the generated HMI project will comprise a pump station object 810, 820.

Figure 9:
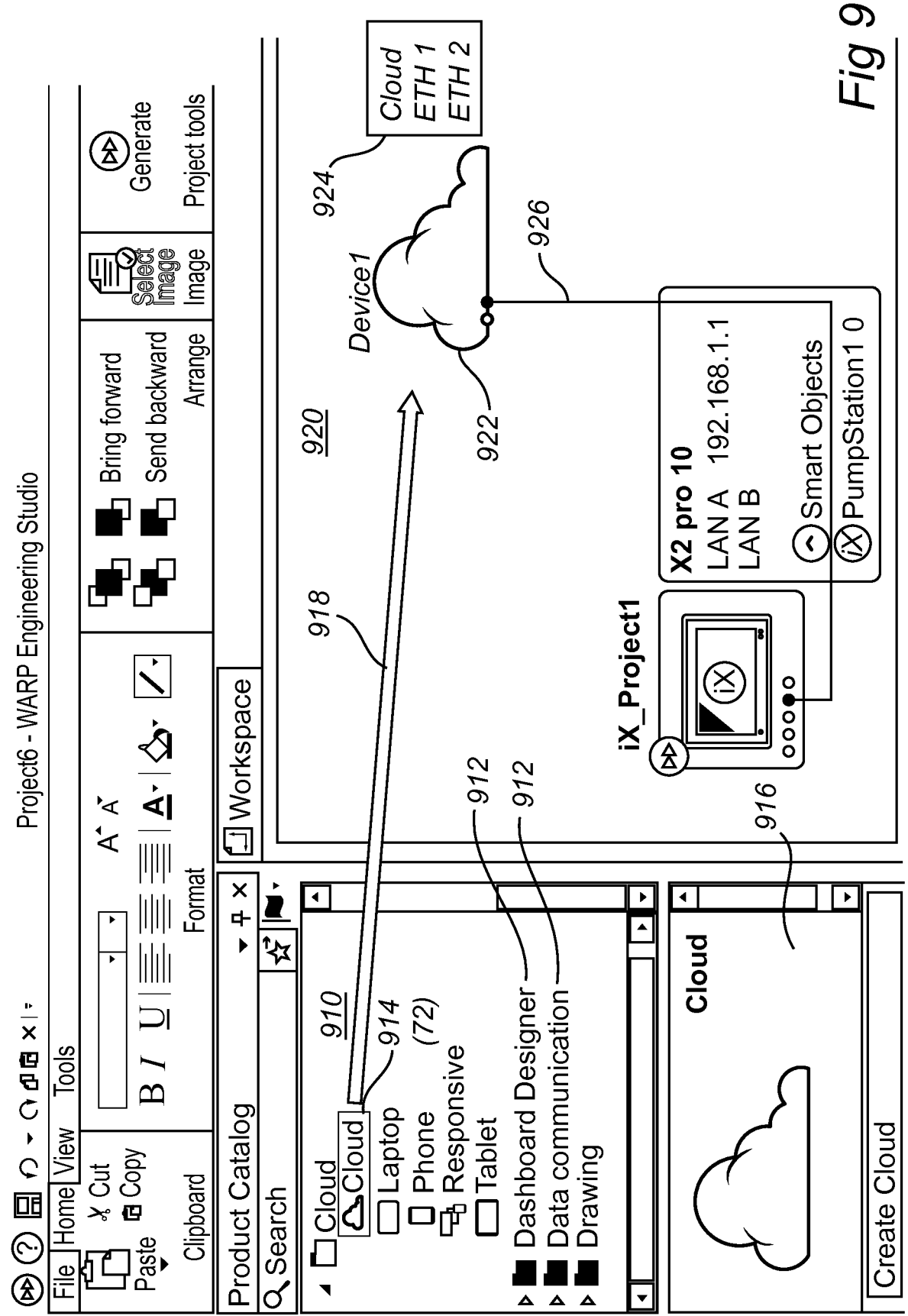

FIG. 9 illustrates step b) in FIG. 1 and step 420 in FIG. 4A. The user 5 chooses a cloud object 72/914 from a list 912 in the product catalog view 910, and drags it onto the workspace 920 in the automation system configuration program 120, as seen at 918. Details of the added cloud object 72/914 are shown at 916, 922, 924 and 926.

FIG. 10 and FIG. 11 have already been referred to. FIG. 10 illustrates how the user 5 may click 1018, 1019 on a connection 1017 between the functional object 70/1014 and the cloud object 72/1014' in the workspace 1020 of the automation system configuration program 120. As a result, a telemetry window 1030 will show the global variables (tags) 1032 of the functional object 70/1014 in a telemetry view 1030. Then, as seen in FIG. 11, the user 5 may choose one of the global variables in the list 1132 and configure it as a unidirectional variable value being readable by the user terminal device 4, a unidirectional variable value being settable by the user terminal device 4, or a bidirectional variable value being both readable and settable by the user terminal device 4. See 1136 in FIG. 11.

Figure 12:
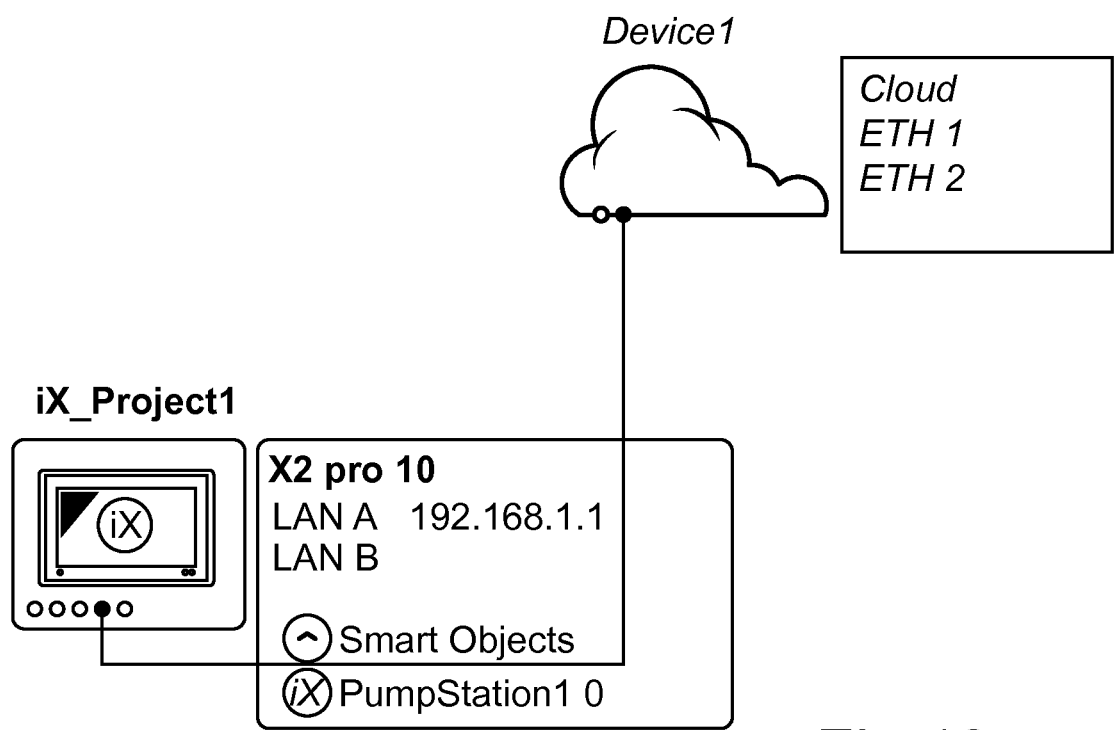

In FIG. 12, the user 5 may command the automation system configuration program 120 to cause insertion of the configured global variables into the generated HMI project. Additionally or alternatively, the automation system configuration program 120 will communicate with the cloud service provider 3 to inform about the configured global variables.

Figure 13:
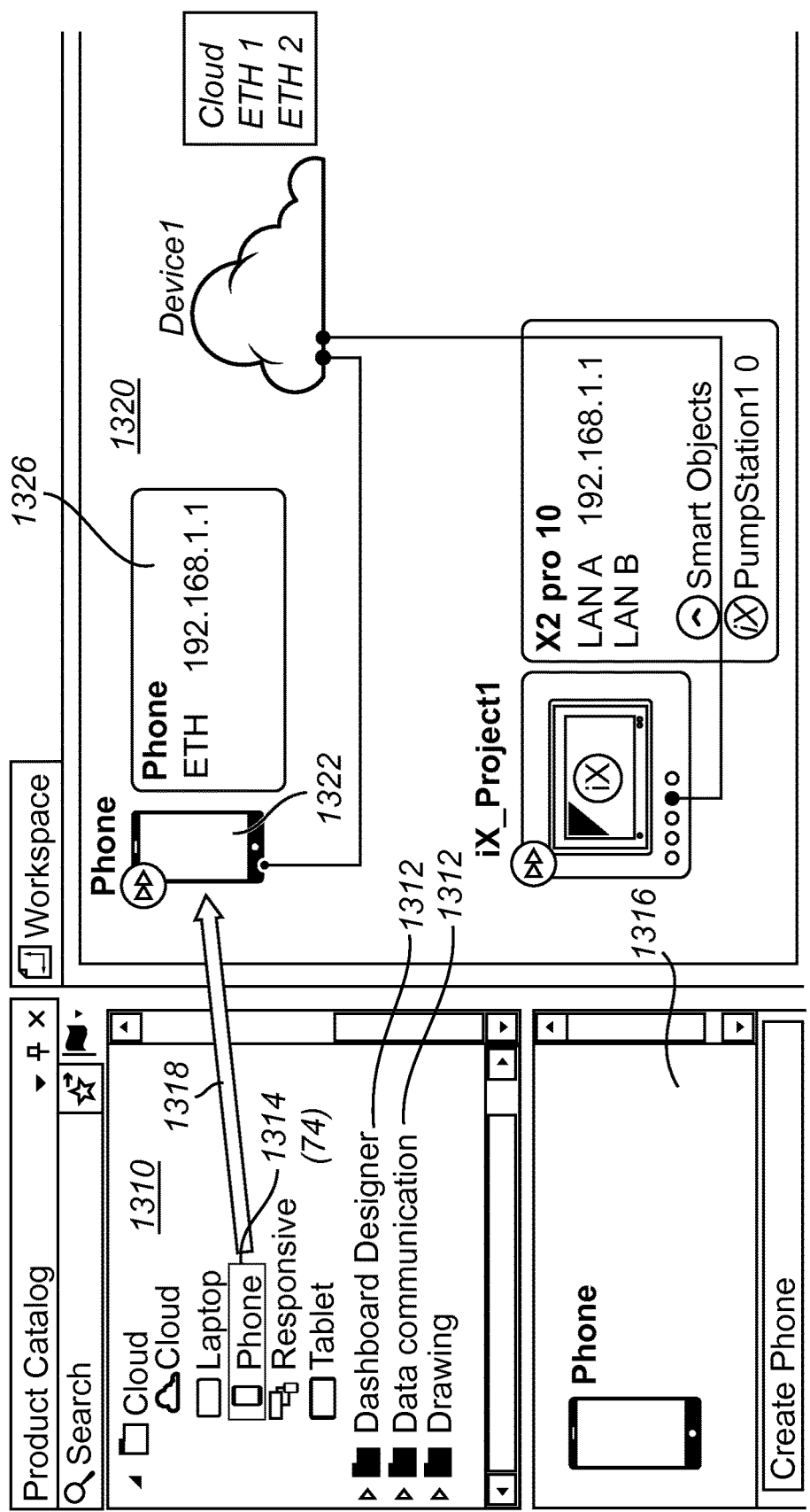

FIG. 13 illustrates step c) in FIG. 1 and step 430 in FIG. 4A. The user 5 chooses a user terminal object 74/1314 from a list 1312 in the product catalog view 1310, and drags it onto the workspace 1320 in the automation system configuration program 120, as seen at 1318. Details of the added user terminal object 74/1314 are shown at 1316, 1322 and 1326.

FIG. 14 illustrates how the user 5 chooses the aforementioned dashboard editor, see 1418, by for instance right-clicking on the user terminal object 74/1314 from FIG. 13. As a result, the dashboard editor opens in a separate view 1510, as seen in FIG. 15A and FIG. 15B which have already been discussed above.

Figure 15C:
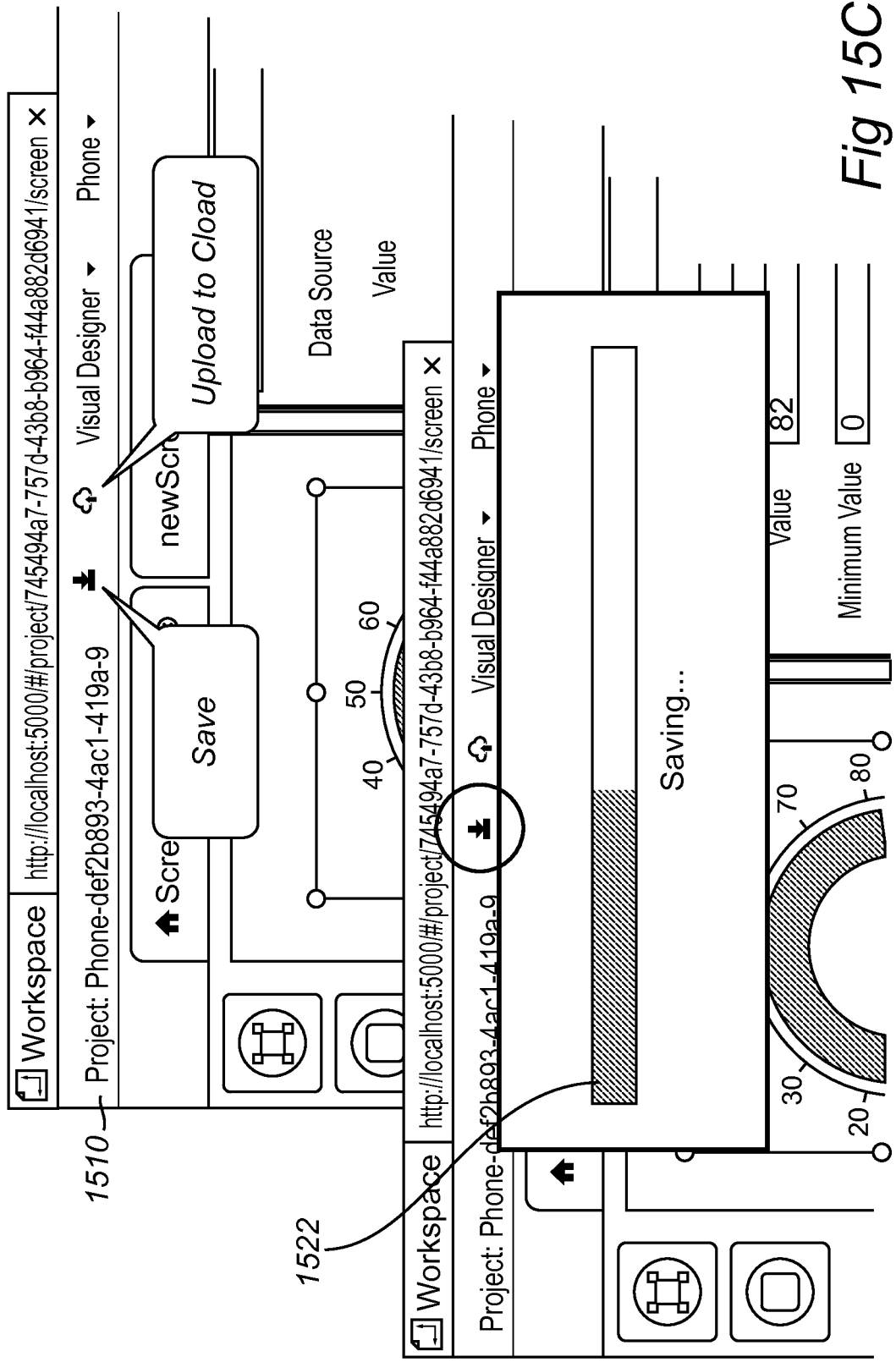
Figure 15D:
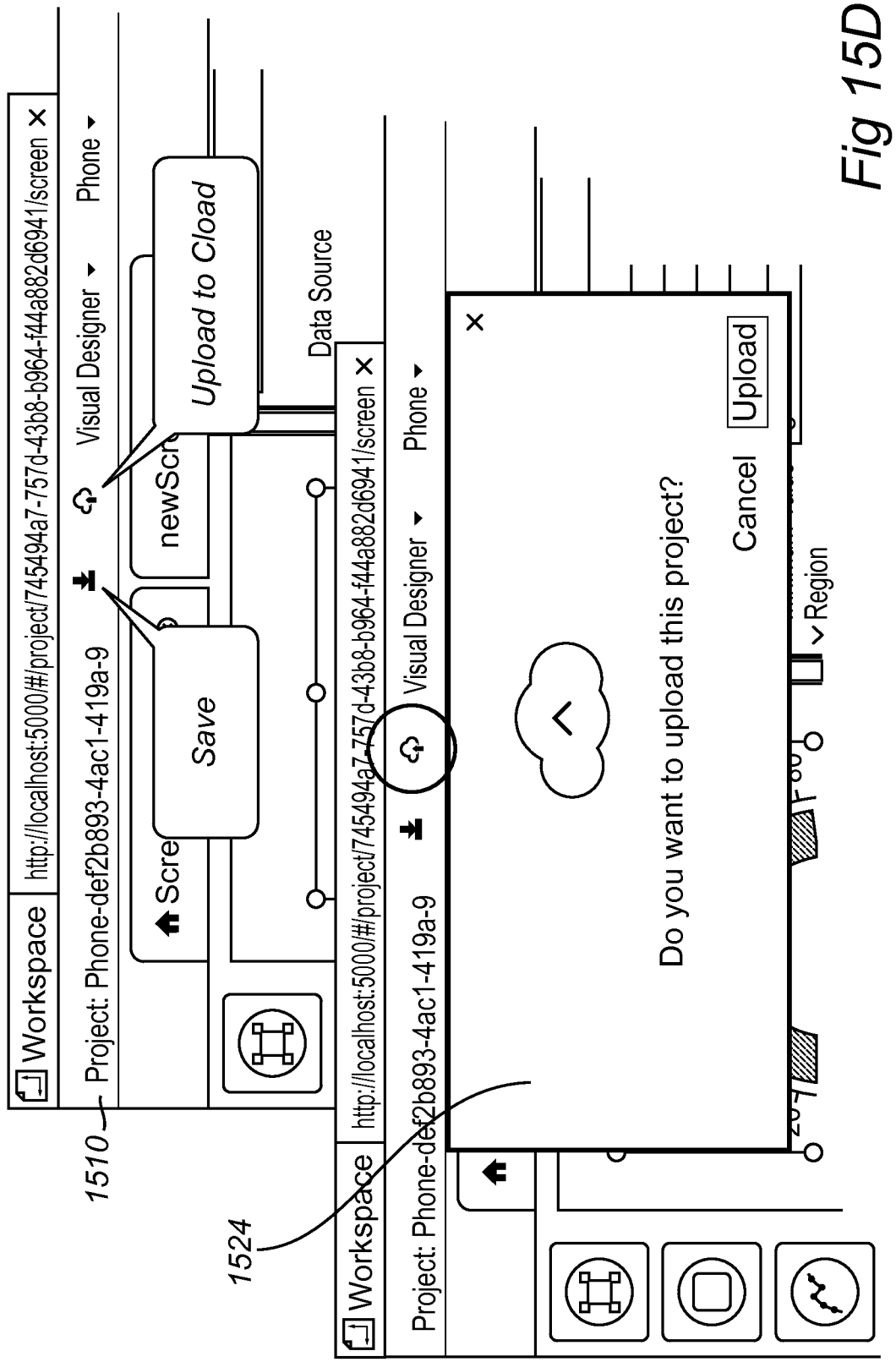
Figure 15E:
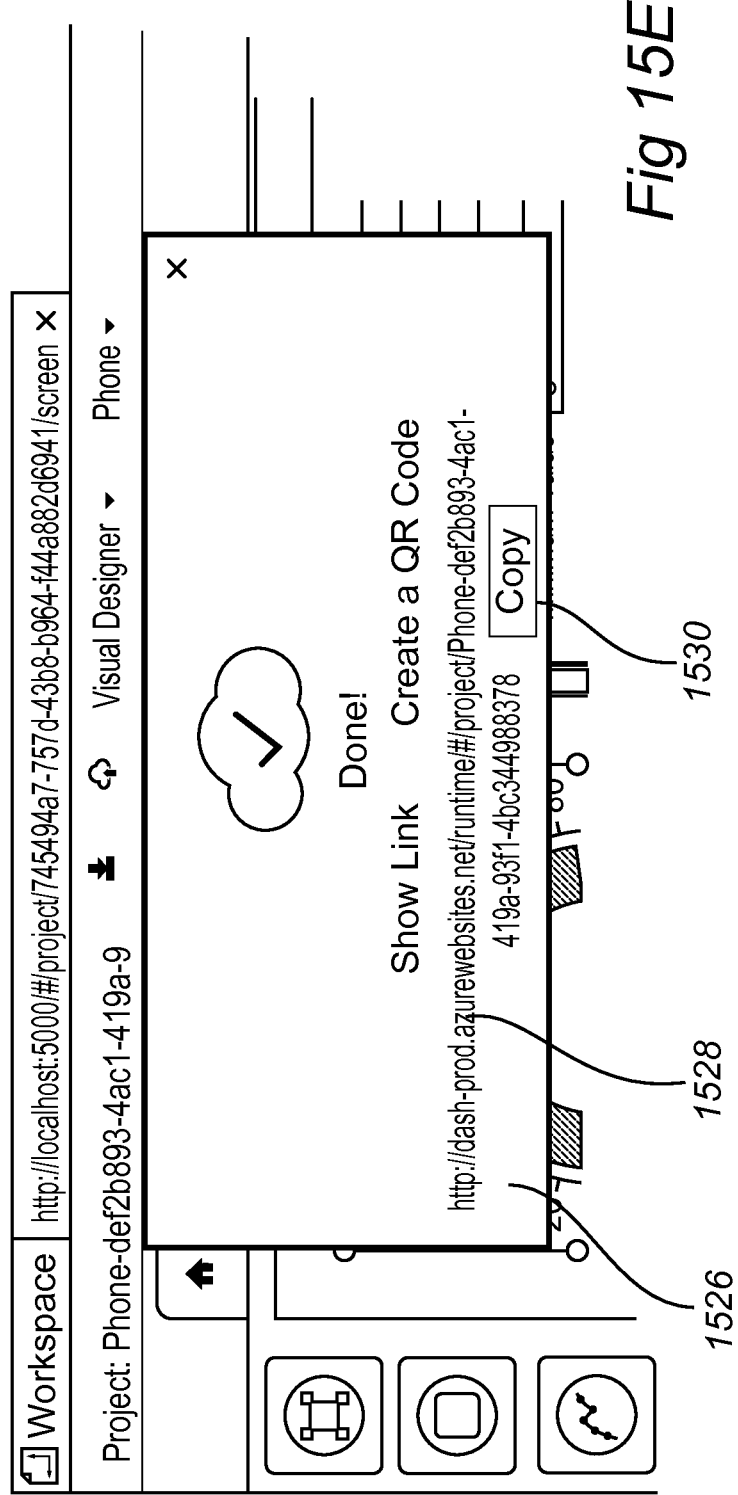
Figure 15F:
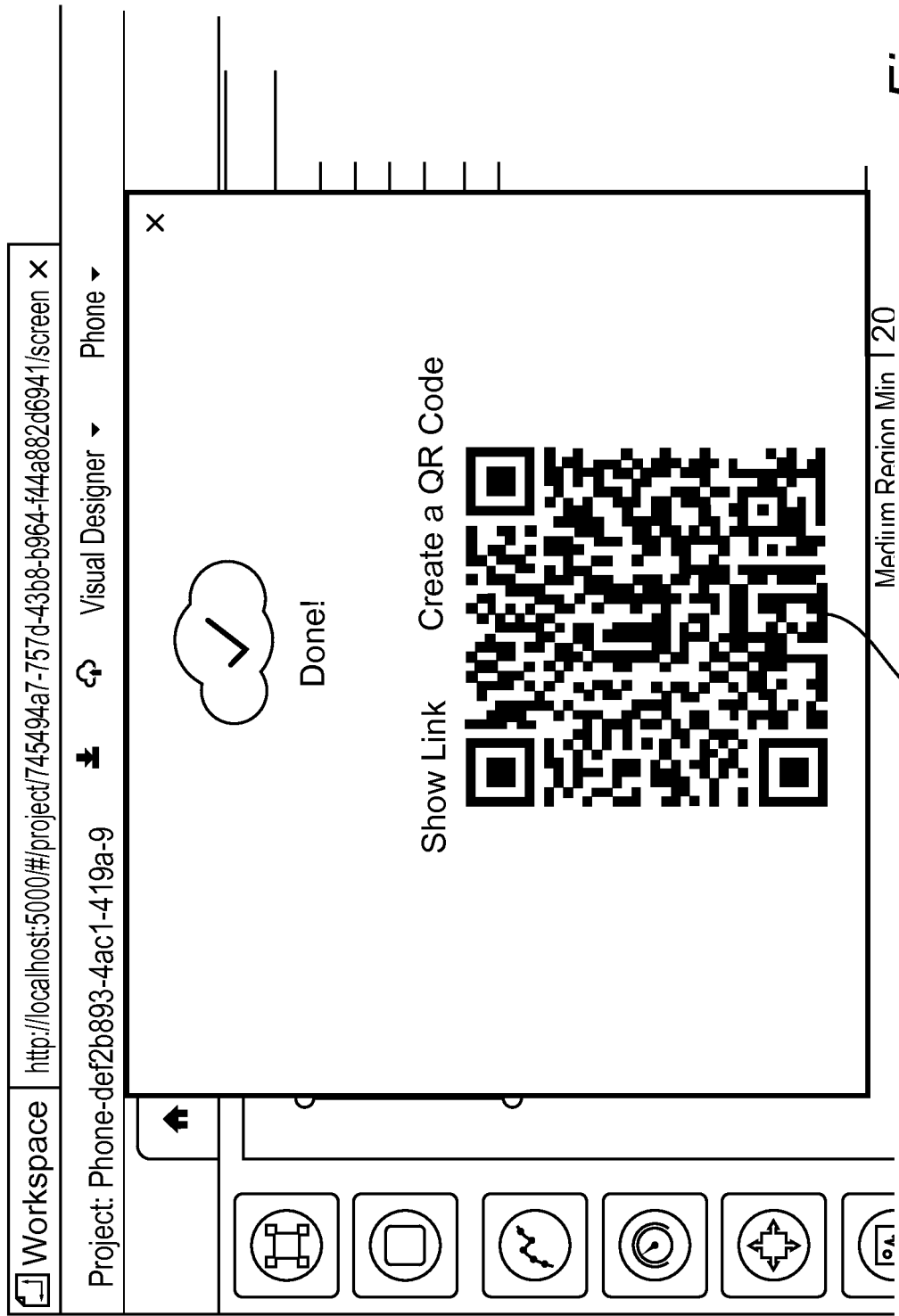

In FIG. 15C, the user 5 may save the project, see 1510 and 1522. The project may then be uploaded to the cloud service provider 3, as seen at 1524 in FIG. 15D.

FIG. 15E and FIG. 15F have already been discussed and show different exemplary forms of links 1528, 1532 for the generated web application program code which is to be read and performed by the user terminal device 4 (for instance in a web browser thereof) in order to communicate with said at least one device 2 of the devices 10, 20, 30 in the industrial automation system 1.

Figure 16:
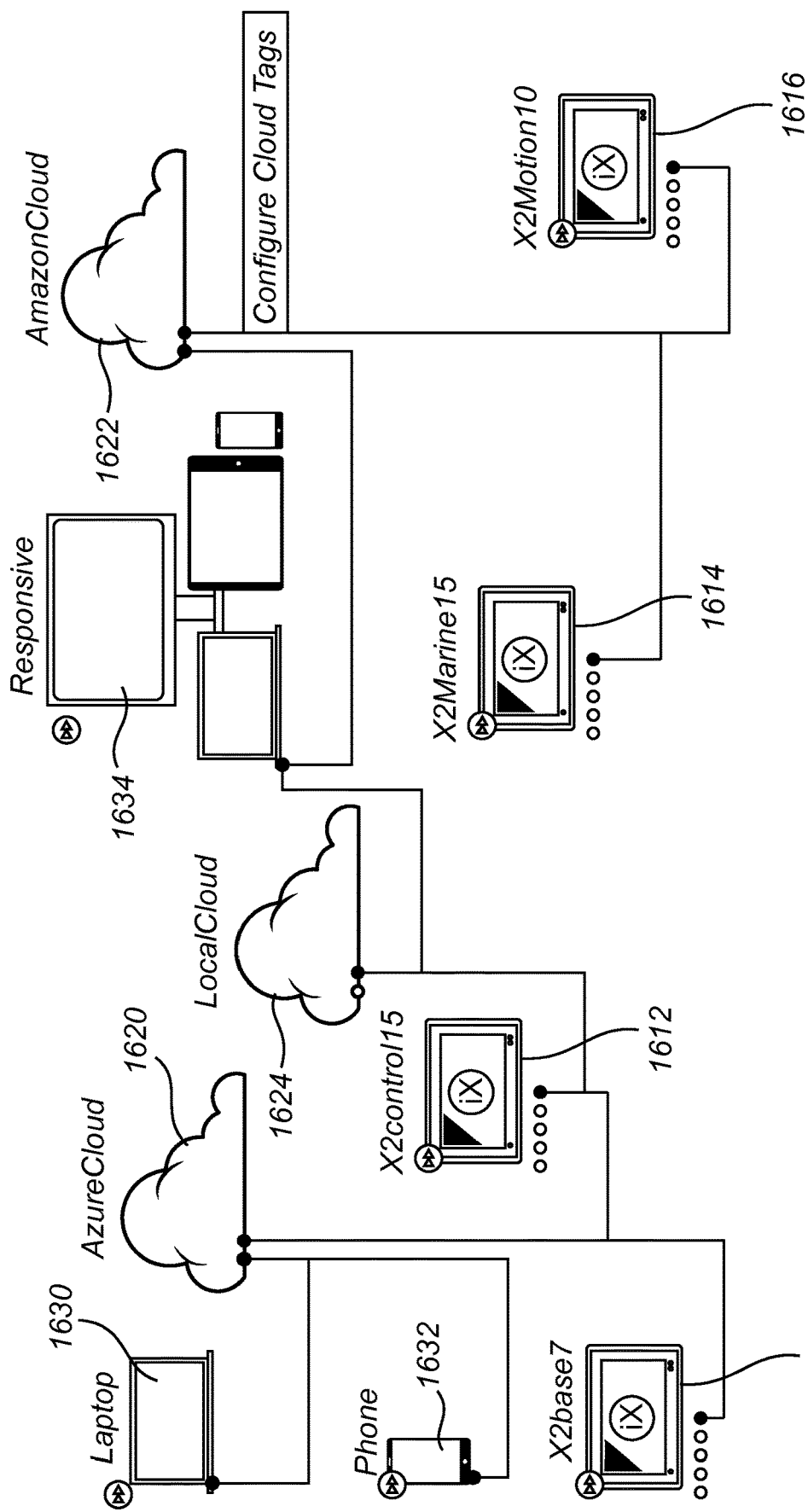

FIG. 16 illustrates a more advanced IoT configuration, involving several devices 1610, 1612, 1614, 1616 represented by respective functional objects 70, several local as well as public cloud providers 1620, 1622, 1624, and several user terminal devices 1630, 1632, 1634.

Figure 5:
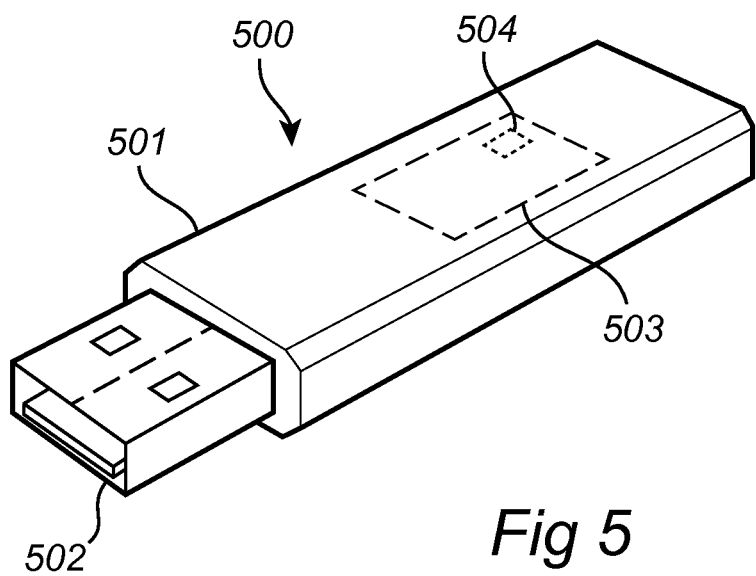
FIG. 5 shows a schematic view of a computer-readable medium implementing the method of configuring an industrial automation system according to an embodiment.

FIG. 5 shows a schematic view of a computer-readable medium as described above. The computer-readable medium 500 is in this embodiment a memory stick, such as a Universal Serial Bus (USB) stick. The USB stick 500 comprises a housing 501 having an interface, such as a connector 502, and a memory chip 503. The memory chip 503 is a flash memory, that is, a non-volatile data storage that can be electrically erased and re-programmed. The memory chip 503 is programmed with instructions 504 that when loaded (possibly via the interface 502) into a controller such as a processor of the computing device 101, for example a PC or special purpose computer, executes a method or procedure according to the embodiments disclosed above. The USB stick is arranged to be connected to and read by a reading device, such as the computing device 101, for loading the instructions into the controller. It should be noted that a computer-readable medium can also be other media such as compact discs, digital video discs, hard drives or other memory technologies commonly used. The instructions can also be downloaded from the computer-readable medium via a wireless interface to be loaded into the controller.

Thus, the present technology may be embodied as a method in a device or system with a computer program product. Accordingly, the present technology may take the form of an entirely hardware embodiment, or an embodiment combining software and hardware aspects all generally referred to herein as a device. Furthermore, the software of the present technology may take the form of a computer program product. The computer program product may be stored on a computer-usable storage medium having computer-usable program code embodied in the medium. The embodiments of this disclosure described with reference to the drawings comprise a computer apparatus and processes performed in the computer apparatus. The program may be in the form of source code, object code a code suitable for use in the implementation of the method. The carrier can be any entity or device capable of carrying the program. For example the carrier may be a record medium, computer memory, read-only memory, computer-readable medium or an electrical carrier signal. Embodiments according to the technology may be carried out when the computer program product is loaded and run in a system or device having computer capabilities, e.g. the computing device 101.

The technology of this disclosure has been described herein with reference to embodiments. However, a person skilled in the art would recognize numerous variations to the described embodiments that would still fall within the scope of the technology. Functional blocks described herein as one unit may be split into two or more units. In the same manner, functional blocks that are described herein as being implemented as two or more units may be implemented as a single unit without departing from the scope of the invention.

Embodiments of the present disclosure have been described herein with reference to flowchart and/or block diagrams. It will be understood that some or all of the illustrated blocks may be implemented by computer program instructions. These computer program instructions may be provided to a processor of a general purpose computer, special purpose computer, or other programmable data processing apparatus to produce a machine, such that the instructions when executed create means for implementing the functions/acts specified in the flowchart otherwise described.

It is to be understood that the functions/acts noted in the flowchart may occur out of the order noted in the operational illustrations. For example, two blocks shown in succession may in fact be executed substantially concurrently or the blocks may sometimes be executed in the reverse order, depending upon the functionality/acts involved.

A computer program product may comprise computer program code portions for executing the method, as described in the description and the claims, for providing control data when the computer program code portions are run by an electronic device having computer capabilities, e.g. the computing device 101.

The invention claimed is:

1. A method of configuring an industrial automation system for internet-of-things accessibility, the industrial automation system having a system hierarchy including low-level devices, automation devices and supervision and production control devices, the method comprising:
   a) receiving, at a computing device, a first user input indicative of a functional object representing one or more of said low-level devices, and/or one or more of said automation devices, and/or one or more of said supervising and production control devices in the industrial automation system;
   b) receiving, at the computing device, a second user input indicative of a cloud object representing a cloud service provider being external to the industrial automation system;

c) receiving, at the computing device, a third user input indicative of a user terminal object representing a user terminal device being external to the industrial automation system;

d) causing, by the computing device, the cloud service provider to enable communication between the user terminal device and at least one of the devices in the industrial automation system as represented by the functional object via the cloud service provider;

e) presenting, at the computing device, a plurality of variables for said at least one of the devices in the industrial automation system as represented by the functional object;

f) receiving, at the computing device, a fourth user input indicative of a selected variable among said plurality of variables; and g) causing, by the computing device, said at least one of the devices in the industrial automation system as represented by the functional object to make the selected variable accessible to the user terminal device, wherein the functional object, cloud object, and user terminal object are selectable objects in an automation system configuration program executed on or by the computing device, said automation system configuration program being communicatively connected with an HMI tool and/or a PLC tool and/or a cloud tool being installed in or accessible by the computing device, wherein the HMI tool is a configuration program for supervision and production control devices in the industrial automation system, and wherein the PLC tool is a configuration program for automation devices in the industrial automation system, and wherein the automation system configuration program executes step g) by invoking functionality in the HMI tool and/or PLC tool and/or cloud tool to communicate with the cloud service provider to make the selected variable communicatively accessible between said at least one of the devices in the industrial automation system and the user terminal device.

2. The method as defined in claim 1, wherein:
the low-level devices comprise sensors and actuators,
the automation devices comprise Programmable Logic Controller, PLC, devices, robots and Computer Numerical Control, CNC, machines, and
the supervision and production control devices comprise Human Machine Interface, HMI, devices, general-purpose computers and special purpose computers.

3. The method as defined in claim 1, further comprising:
e) presenting, at the computing device, a plurality of variables for said at least one of the devices in the industrial automation system as represented by the functional object;
f) receiving, at the computing device, a fourth user input indicative of a selected variable among said plurality of variables; and
g) causing, by the computing device, said at least one of the devices in the industrial automation system as represented by the functional object to make the selected variable accessible to the user terminal device.

4. The method as defined in claim 3, wherein the fourth user input in step f) is further indicative of whether the selected variable is to be made accessible to the user terminal device as:
a unidirectional variable value being readable by the user terminal device,
a unidirectional variable value being settable by the user terminal device, or
a bidirectional variable value being both readable and settable by the user terminal device.

5. The method as defined in claim 4, further comprising the following at run-time:
when the selected variable is a bidirectional variable or a unidirectional variable value being readable by the user terminal device, said at least one of the devices in the industrial automation system communicating with the cloud service provider at a defined periodicity or time scheme to report a current value of the selected variable, wherein the cloud service provider receives the reported current value and stores it in a database or similar storage;
when the selected variable is a bidirectional variable or a unidirectional variable value being settable by the user terminal device, said at least one of the devices in the industrial automation system communicating with the cloud service provider at the defined periodicity or time scheme to retrieve a value of the selected variable as changed by the user terminal device and stored by the cloud service provider in its database or similar storage; and
the user terminal device communicating with the cloud service provider to retrieve the stored variable value from the database or similar storage and to provide a changed variable value to be stored in the database or similar storage, respectively.

6. The method as defined in claim 1, wherein said step d) of causing the cloud service provider to enable communication between the user terminal device and at least one of the devices in the industrial automation system comprises:
generating web application program code to be read and performed by the user terminal device in order to communicate with said at least one of the devices in the industrial automation system.

7. The method as defined in claim 6, wherein said step d) of causing the cloud service provider to enable communication between the user terminal device and at least one of the devices in the industrial automation system further comprises:
generating and/or administrating a link to the generated web application program code; and
providing the link to the user terminal device.

8. The method as defined in claim 7, further comprising:
the user terminal device using the link to retrieve the generated web application program code.

9. A computer program product comprising a non- transitory computer-readable medium, having thereon computer program code means, when said computer program product is loaded, to make a computer execute the method of configuring an industrial automation system as defined in claim 1.

10. The method as defined in claim 1, wherein the functional object, the cloud object and the user terminal object are selectable objects which may be dragged by a user from a selection area and dropped onto a workspace or canvas area of the automation system configuration program.

11. The method as defined in claim 1, further comprising the automation system configuration program executing step d) by invoking functionality in the HMI tool and/or PLC tool and/or cloud tool to communicate with the cloud service provider to enable said communication between said at least one of the devices in the industrial automation system and the user terminal device.

12. The method as defined in claim 11, wherein the cloud service provider and said at least one of the devices in the industrial automation system are configured for communication with each other during runtime using an IP address.

13. A method of configuring an industrial automation system for internet-of-things accessibility, the industrial automation system having a system hierarchy including low-level devices, automation devices and supervision and production control devices, the method comprising:
   a) receiving, at a computing device, a first user input indicative of a functional object representing one or more of said low-level devices, and/or one or more of said automation devices, and/or one or more of said supervising and production control devices in the industrial automation system;
   b) receiving, at the computing device, a second user input indicative of a cloud object representing a cloud service provider being external to the industrial automation system;
   c) receiving, at the computing device, a third user input indicative of a user terminal object representing a user terminal device being external to the industrial automation system;
   d) causing, by the computing device, the cloud service provider to enable communication between the user terminal device and at least one of the devices in the industrial automation system as represented by the functional object via the cloud service provider, wherein this causing step comprises generating web application program code to be read and performed by the user terminal device in order to communicate with said at least one of the devices in the industrial automation system;
   e) presenting, at the computing device, a plurality of variables for said at least one of the devices in the industrial automation system as represented by the functional object;
   f) receiving, at the computing device, a fourth user input indicative of a selected variable among said plurality of variables;
   g) causing, by the computing device, said at least one of the devices in the industrial automation system as represented by the functional object to make the selected variable accessible to the user terminal device;
   h) providing, at the computing device, a dashboard editor;
   i) receiving, at the computing device, a fifth user input indicative of a selected visualization of the selected variable which is to be made accessible to the user terminal device; and
   j) causing, by the computing device, implementation of the selected visualization in the web application program code to be read and performed by the user terminal device.

14. The method as defined in claim 13, wherein the functional object, the cloud object and the user terminal object are selectable objects in an automation system configuration program executed on or by the computing device.

15. The method as defined in claim 14, wherein the functional object, the cloud object and the user terminal object are selectable objects which may be dragged by a user from a selection area and dropped onto a workspace or canvas area of the automation system configuration program.

16. The method as defined in claim 14, said automation system configuration program being communicatively connected with a HMI tool and/or a PLC tool and/or a cloud tool being installed in or accessible by the computing device, wherein the HMI tool is a configuration program for supervision and production control devices in the industrial automation system, and wherein the PLC tool is a configuration program for automation devices in the industrial automation system.

17. The method as defined in claim 16, further comprising the automation system configuration program executing step d) by invoking functionality in the HMI tool and/or PLC tool and/or cloud tool to communicate with the cloud service provider to enable said communication between said at least one of the devices in the industrial automation system and the user terminal device.

18. The method as defined in claim 17, wherein the cloud service provider and said at least one of the devices in the industrial automation system are configured for communication with each other during runtime using an IP address.

19. The method as defined in claim 13, wherein the visualization is one or more of a graphical meter, a diagram, a chart, a numerical indication, a symbol, and an icon.

20. The method as defined in claim 13, wherein:
   the low-level devices comprise sensors and actuators,
   the automation devices comprise Programmable Logic Controller, PLC, devices, robots and Computer Numerical Control, CNC, machines, and
   the supervision and production control devices comprise Human Machine Interface, HMI, devices, general-purpose computers and special purpose computers.

21. The method as defined in claim 13, further comprising:
   e) presenting, at the computing device, a plurality of variables for said at least one of the devices in the industrial automation system as represented by the functional object;
   f) receiving, at the computing device, a fourth user input indicative of a selected variable among said plurality of variables; and
   g) causing, by the computing device, said at least one of the devices in the industrial automation system as represented by the functional object to make the selected variable accessible to the user terminal device.

22. The method as defined in claim 21, wherein the fourth user input in step f) is further indicative of whether the selected variable is to be made accessible to the user terminal device as:
   a unidirectional variable value being readable by the user terminal device,
   a unidirectional variable value being settable by the user terminal device, or
   a bidirectional variable value being both readable and settable by the user terminal device.

23. The method as defined in claim 22, further comprising the following at run-time:
   when the selected variable is a bidirectional variable or a unidirectional variable value being readable by the user terminal device, said at least one of the devices in the industrial automation system communicating with the cloud service provider at a defined periodicity or time scheme to report a current value of the selected variable, wherein the cloud service provider receives the reported current value and stores it in a database or similar storage;
   when the selected variable is a bidirectional variable or a unidirectional variable value being settable by the user terminal device, said at least one of the devices in the industrial automation system communicating with the cloud service provider at the defined periodicity or time scheme to retrieve a value of the selected variable as changed by the user terminal device and stored by the cloud service provider in its database or similar storage; and the user terminal device communicating with the cloud service provider to retrieve the stored variable value from the database or similar storage and to provide a changed variable value to be stored in the database or similar storage, respectively.

24. The method as defined in claim 13, wherein said step d) of causing the cloud service provider to enable communication between the user terminal device and at least one of the devices in the industrial automation system comprises:

generating web application program code to be read and performed by the user terminal device in order to communicate with said at least one of the devices in the industrial automation system.

25. The method as defined in claim 24, wherein said step d) of causing the cloud service provider to enable communication between the user terminal device and at least one of the devices in the industrial automation system further comprises:

generating and/or administrating a link to the generated web application program code; and providing the link to the user terminal device.

26. The method as defined in claim 25, further comprising:

the user terminal device using the link to retrieve the generated web application program code.

27. A computer program product comprising a non-transitory computer-readable medium, having thereon computer program code means, when said computer program product is loaded, to make a computer execute the method of configuring an industrial automation system as defined in claim 13.

\* \* \* \* \*